(12) United States Patent
Ronen et al.

(10) Patent No.: US 11,914,187 B2
(45) Date of Patent: Feb. 27, 2024

(54) IMAGE WAVEGUIDE WITH SYMMETRIC BEAM MULTIPLICATION

(71) Applicant: Lumus Ltd., Ness Ziona (IL)

(72) Inventors: Eitan Ronen, Rechovot (IL); Ronen Chriki, Lod (IL); Daniel Michaels, Ramat Gan (IL)

(73) Assignee: LUMUS LTD., Ness Ziona (IL)

( * ) Notice: Subject to any disclaimer, the term of this patent is extended or adjusted under 35 U.S.C. 154(b) by 493 days.

(21) Appl. No.: 17/420,675

(22) PCT Filed: Jul. 5, 2020

(86) PCT No.: PCT/IL2020/050753
§ 371 (c)(1),
(2) Date: Jul. 4, 2021

(87) PCT Pub. No.: WO2021/001841
PCT Pub. Date: Jan. 7, 2021

(65) Prior Publication Data
US 2022/0099885 A1   Mar. 31, 2022

Related U.S. Application Data

(60) Provisional application No. 62/870,699, filed on Jul. 4, 2019.

(51) Int. Cl.
*G02B 6/10* (2006.01)
*G02B 27/01* (2006.01)

(52) U.S. Cl.
CPC ........... *G02B 6/10* (2013.01); *G02B 27/0172* (2013.01); *G02B 2027/0178* (2013.01)

(58) Field of Classification Search
CPC .................. G02B 6/10; G02B 27/0172; G02B 2027/0178; G02B 27/14
See application file for complete search history.

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 103837988 | 6/2014 |

(Continued)

OTHER PUBLICATIONS

S.Chattopadhyay el al: "Anti-reflecting and pholonic nanostructures", Materials Science and Engineering: R: Repots, ol. 69, No. 1-3, Jun. 20, 2010, pp. 1-35.

(Continued)

*Primary Examiner* — Collin X Beatty
(74) *Attorney, Agent, or Firm* — Rivka Friedman

(57) ABSTRACT

An optical system for displaying an image includes a waveguide (10) having two major surfaces (12, 14) that support propagation of image illumination by internal reflection. A coupling-out configuration (16, 18) couples out image illumination towards the eye of the user. An image projector (20) is coupled so as to introduce image illumination into the waveguide so as to propagate by internal reflection. The waveguide also contains a symmetrical beam multiplier region, distinct from the coupling-out region, having one or more beam splitters (24) internal to the waveguide and parallel to its major surfaces. The symmetrical beam multiplier may be used to fill in a conjugate image after a compact coupling-in configuration, and/or may be used to fill the waveguide with the image as an intermediate stage (36) between two optical aperture expansion configurations (32, 34).

4 Claims, 17 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | St Leger |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,341,230 A | 8/1994 | Smith |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Maechler |
| 5,708,449 A | 1/1998 | Heacock et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,023,372 A | 2/2000 | Spitzer et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,264,328 B1 | 7/2001 | Williams |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,519,400 B2 | 2/2003 | Biscardi et al. |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai |
| 6,671,100 B1 | 12/2003 | McRuer |
| 6,690,513 B2 | 2/2004 | Hulse et al. |
| 6,710,902 B2 | 3/2004 | Takeyama |
| 6,762,801 B2 | 7/2004 | Weiss et al. |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Ida et al. |
| 6,805,490 B2 | 10/2004 | Levola |
| 6,829,095 B2 | 12/2004 | Amitai |
| 6,847,488 B2 | 1/2005 | Travis |
| 6,880,931 B2 | 4/2005 | Moliton et al. |
| 6,927,694 B1 | 9/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,405,881 B2 | 7/2008 | Shimizu et al. |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | AMitai |
| 7,570,859 B1 | 8/2009 | DeJong |
| 7,589,901 B2 | 9/2009 | DeJong et al. |
| 7,613,373 B1 | 11/2009 | DeJong |
| 7,653,268 B1 | 1/2010 | DeJong |
| 7,751,122 B2 | 7/2010 | Amitai |
| 7,778,508 B2 | 8/2010 | Hirayama |
| 7,839,575 B2 | 11/2010 | DeJong et al. |
| 7,949,214 B2 | 5/2011 | DeJong |
| 7,995,275 B2 | 8/2011 | Maeda et al. |
| 8,035,872 B2 | 10/2011 | Ouchi |
| 8,369,019 B2 | 2/2013 | Baker et al. |
| 8,391,668 B2 | 3/2013 | DeJong |
| 8,432,614 B2 | 4/2013 | Amitai |
| 8,472,119 B1 | 6/2013 | Kelly |
| 8,531,773 B2 | 9/2013 | DeJong |
| 8,548,290 B2 | 10/2013 | Travers |
| 8,649,099 B2 | 2/2014 | Schultz et al. |
| 8,655,178 B2 | 2/2014 | Capron et al. |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,870,384 B2 | 10/2014 | Imai et al. |
| 8,873,148 B1 | 10/2014 | Gupta et al. |
| 8,913,865 B1 | 12/2014 | Bennett |
| 9,025,253 B2 | 5/2015 | Hadad et al. |
| 9,541,762 B2 | 1/2017 | Mukawa et al. |
| 9,568,738 B2 | 2/2017 | Mansharof et al. |
| 9,766,459 B2 | 9/2017 | Alton et al. |
| 9,784,985 B2 | 10/2017 | Poon |
| 9,791,703 B1 | 10/2017 | Vallius |
| 9,798,061 B2 | 10/2017 | Hsiao et al. |
| 9,805,633 B2 | 10/2017 | Zheng |
| 9,933,684 B2 | 4/2018 | Brown et al. |
| 10,133,070 B2 | 11/2018 | Danziger |
| 10,302,835 B2 | 5/2019 | Danziger |
| 10,302,957 B2 | 5/2019 | Sissom |
| 10,317,679 B2 | 6/2019 | Ayres et al. |
| 10,437,068 B2 | 10/2019 | Weng et al. |
| 10,558,044 B2 | 2/2020 | Pan |
| 10,564,417 B2 | 2/2020 | Danziger |
| 10,564,430 B2 | 2/2020 | Amitai et al. |
| 10,571,699 B1 | 2/2020 | Parsons et al. |
| 10,732,461 B2 | 8/2020 | Yoshida |
| 10,739,512 B2 | 8/2020 | Eisenfeld et al. |
| 10,809,528 B2 | 10/2020 | Amitai |
| 10,962,787 B1 | 3/2021 | Lou et al. |
| 10,983,264 B2 | 4/2021 | Danziger et al. |
| 11,054,581 B2 | 7/2021 | Ayres et al. |
| 11,187,902 B2 | 11/2021 | Urness et al. |
| 11,262,564 B2 | 3/2022 | Tanaka |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |

(56) References Cited

U.S. PATENT DOCUMENTS

| | | |
|---|---|---|
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0017465 A1 | 1/2005 | Bergstrom |
| 2005/0018308 A1 | 1/2005 | Cassarly et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0268421 A1 | 11/2006 | Shimizu et al. |
| 2007/0002191 A1 | 1/2007 | Hashizume et al. |
| 2007/0007085 A1 | 3/2007 | Hirayama |
| 2007/0070859 A1 | 3/2007 | Hirayama |
| 2007/0165192 A1 | 7/2007 | Prior |
| 2008/0094586 A1 | 4/2008 | Hirayama |
| 2008/0151379 A1 | 6/2008 | Amitai |
| 2009/0059380 A1 | 3/2009 | Moliton |
| 2009/0122414 A1 | 5/2009 | AMitai |
| 2009/0190222 A1 | 7/2009 | Simmonds et al. |
| 2010/0027289 A1 | 2/2010 | Aiki et al. |
| 2010/0053148 A1 | 3/2010 | Khazeni et al. |
| 2010/0202128 A1 | 8/2010 | Saccomanno |
| 2010/0278480 A1 | 11/2010 | Vasylyev |
| 2010/0291489 A1 | 11/2010 | Moskovits et al. |
| 2011/0176218 A1 | 7/2011 | Noui |
| 2012/0039576 A1 | 2/2012 | Dangel et al. |
| 2012/0044572 A1 | 2/2012 | Simmonds et al. |
| 2012/0147361 A1 | 6/2012 | Mochizuki et al. |
| 2012/0182525 A1 | 7/2012 | Imai et al. |
| 2012/0206817 A1 | 8/2012 | Totani et al. |
| 2012/0306940 A1 | 12/2012 | Machida et al. |
| 2013/0007833 A1 | 1/2013 | Kitazato et al. |
| 2013/0163089 A1 | 6/2013 | Bohn |
| 2013/0025043 A1 | 9/2013 | Robbins et al. |
| 2013/0150430 A1 | 9/2013 | Robbins et al. |
| 2013/0150431 A1 | 9/2013 | Robbins et al. |
| 2013/0242392 A1 | 9/2013 | Amirparviz et al. |
| 2013/0250430 A1 | 9/2013 | Robbuns et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0374377 A1 | 12/2014 | schulz et al. |
| 2015/0013105 A1 | 1/2015 | Kuan |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0160529 A1 | 6/2015 | Popovich et al. |
| 2015/0219834 A1 | 8/2015 | Nichol et al. |
| 2015/0338655 A1 | 11/2015 | Sawada et al. |
| 2016/0116739 A1 | 4/2016 | TeKolste et al. |
| 2016/0234485 A1 | 8/2016 | Robbins et al. |
| 2016/0313567 A1 | 10/2016 | Kurashige |
| 2016/0314564 A1 | 10/2016 | Jones et al. |
| 2017/0003504 A1 | 1/2017 | Vallius |
| 2017/0023761 A1 | 1/2017 | Dural et al. |
| 2017/0045743 A1 | 2/2017 | Dobschal et al. |
| 2017/0075119 A1 | 3/2017 | Schultz et al. |
| 2017/0122725 A1 | 5/2017 | Yeoh |
| 2017/0242249 A1 | 8/2017 | Wall |
| 2017/0275396 A1 | 9/2017 | Ebisawa et al. |
| 2017/0276947 A1 | 9/2017 | Yokoyama |
| 2017/0285346 A1 | 10/2017 | Pan |
| 2017/0285348 A1 | 10/2017 | Tyres et al. |
| 2017/0293140 A1 | 10/2017 | Cai et al. |
| 2017/0343822 A1 | 11/2017 | Border et al. |
| 2017/0357100 A1 | 12/2017 | Ouderkirk et al. |
| 2017/0363799 A1 | 12/2017 | Ofir et al. |
| 2017/0371160 A1 | 12/2017 | Schultz |
| 2018/0039082 A1 | 2/2018 | Amitai |
| 2018/0101087 A1 | 4/2018 | Shiohara |
| 2018/0143509 A1 | 5/2018 | Oh |
| 2018/0210198 A1 | 7/2018 | Brown et al. |
| 2018/0210202 A1 | 7/2018 | Danziger |
| 2018/0246333 A1 | 8/2018 | Sawada et al. |
| 2018/0246335 A1 | 8/2018 | Cheng et al. |
| 2018/0267317 A1 | 9/2018 | Amitai |
| 2018/0284445 A1 | 10/2018 | Matsuki et al. |
| 2018/0284448 A1 | 10/2018 | Matsuki |
| 2018/0372940 A1 | 12/2018 | Ishii et al. |
| 2019/0056593 A1 | 2/2019 | Bablumyan |
| 2019/0064518 A1 | 2/2019 | Danziger |
| 2019/0212487 A1 | 7/2019 | Danziger |
| 2019/0227317 A1 | 7/2019 | Trail et al. |
| 2019/0293838 A1 | 9/2019 | Haba |
| 2020/0209667 A1 | 7/2020 | Sharlin et al. |
| 2020/0225476 A1 | 7/2020 | Urness et al. |
| 2020/0225484 A1 | 7/2020 | Takagi et al. |
| 2020/0278554 A1 | 9/2020 | Schultz et al. |
| 2021/0018755 A1 | 1/2021 | Amitai |
| 2021/0033773 A1 | 2/2021 | Danziger et al. |
| 2021/0149199 A1 | 5/2021 | Guan et al. |
| 2021/0239898 A1 | 8/2021 | Danziger et al. |
| 2021/0247608 A1 | 8/2021 | Eisenfeld et al. |
| 2022/0075194 A1 | 3/2022 | Ronen et al. |
| 2022/0099885 A1 | 3/2022 | Ronen et al. |
| 2022/0317467 A1 | 10/2022 | Danziger |

FOREIGN PATENT DOCUMENTS

| | | |
|---|---|---|
| CN | 107238928 | 10/2017 |
| CN | 109613644 A | 4/2019 |
| DE | 1422172 | 11/1970 |
| DE | 19725262 | 12/1998 |
| DE | 102013106392 | 12/2014 |
| EP | 0380035 | 8/1990 |
| EP | 0399865 | 11/1990 |
| EP | 0543718 | 5/1993 |
| EP | 0566004 | 10/1993 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 1514977 | 6/1978 |
| GB | 2220081 | 12/1989 |
| GB | 2272980 | 6/1994 |
| GB | 2278222 | 11/1994 |
| GB | 2278888 | 12/1994 |
| GB | 2495398 | 4/2013 |
| JP | H09258062 | 10/1997 |
| JP | 2002539498 | 11/2002 |
| JP | 2003140081 | 5/2003 |
| JP | 2004527801 | 9/2004 |
| JP | 2005084522 | 3/2005 |
| JP | 2006145644 | 6/2006 |
| JP | 2010044172 | 2/2010 |
| JP | 2011-028141 | 2/2011 |
| JP | 2012058404 | 3/2012 |
| JP | 2012123936 | 6/2012 |
| JP | 2014153545 A | 8/2014 |
| JP | 2016028275 | 2/2016 |
| WO | 0004407 | 1/2000 |
| WO | 0063738 | 10/2000 |
| WO | 0195025 | 12/2001 |
| WO | 2005093493 | 10/2005 |
| WO | 2006098097 | 9/2006 |
| WO | 2009074638 | 6/2009 |
| WO | 2011130720 | 10/2011 |
| WO | 2013065656 | 5/2013 |
| WO | 2015081313 | 6/2015 |
| WO | 2017106873 | 6/2017 |

(56) References Cited

FOREIGN PATENT DOCUMENTS

| WO | WO-2017141240 A1 * | 8/2017 | ......... G02B 27/0081 |
|---|---|---|---|
| WO | 2018/013307 | 1/2018 | |
| WO | 2021/111447 | 6/2021 | |
| WO | 2021/245664 | 12/2021 | |

OTHER PUBLICATIONS

Petros Stavroulakis et al: Suppression of backscattered diffraction from sub-wavelenght "moth-eye" arrays References and Links/ Optics Express 1", Endeavour Nanotechnology Zoolog_ Sci_ Philos_ Trans_ J_ Mod_ Opt Appl ppt. Opt. Acta {Lond.) Appl. Opt. Appl. Opt. Opt. Lett. Jpn.☐Appl. Pjys. J. Ceram. Soc. Jpn. Opt. Commun. App;. Opt ppt. Lett. Nanotechno, Jan. 1, 1967, pp. 79-84.

Chin-Hao Chang el al: "Nanostructured gradient-index anlireflection diffractive optics", Optics Letters, vol. 36, No. 12, Jun. 5, 2011, p. 2354.

Piaoyin Yang et al: "Antireflection effects at nanostructured material interfaces and the suppression of thin-film nterference", Nanotechnology, vol. 24, No. 23, May 15, 2013, p. 235202.

R.. J_ Weiblen el al: "Optimized moth-eye anti-reflective structures for As_2S_3 chalcogenlide optical fibers", Optics Express vol. 24, Issue 10, pp. 10172-10187 (2016) •https://doi.org/10.1364/OE.24.010172.

Da-Yong et al., "A Continuous Membrance Micro Deformable Mirror Based On Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

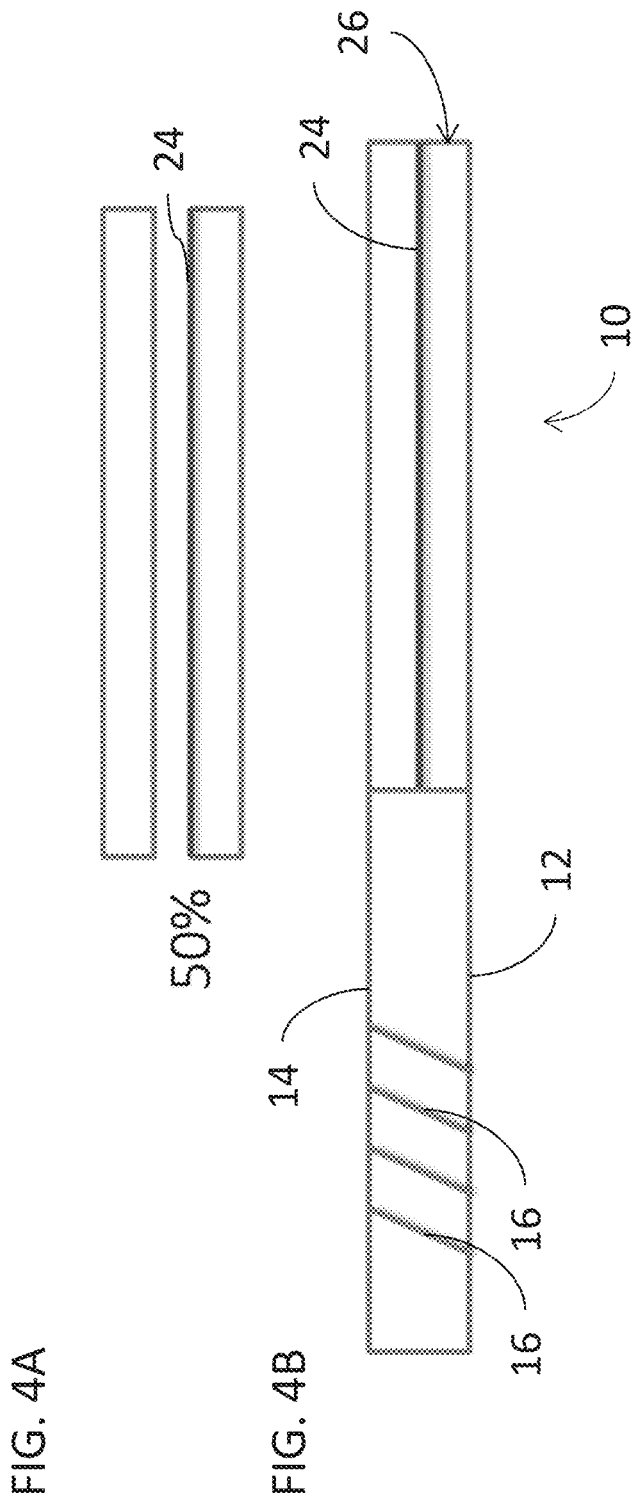

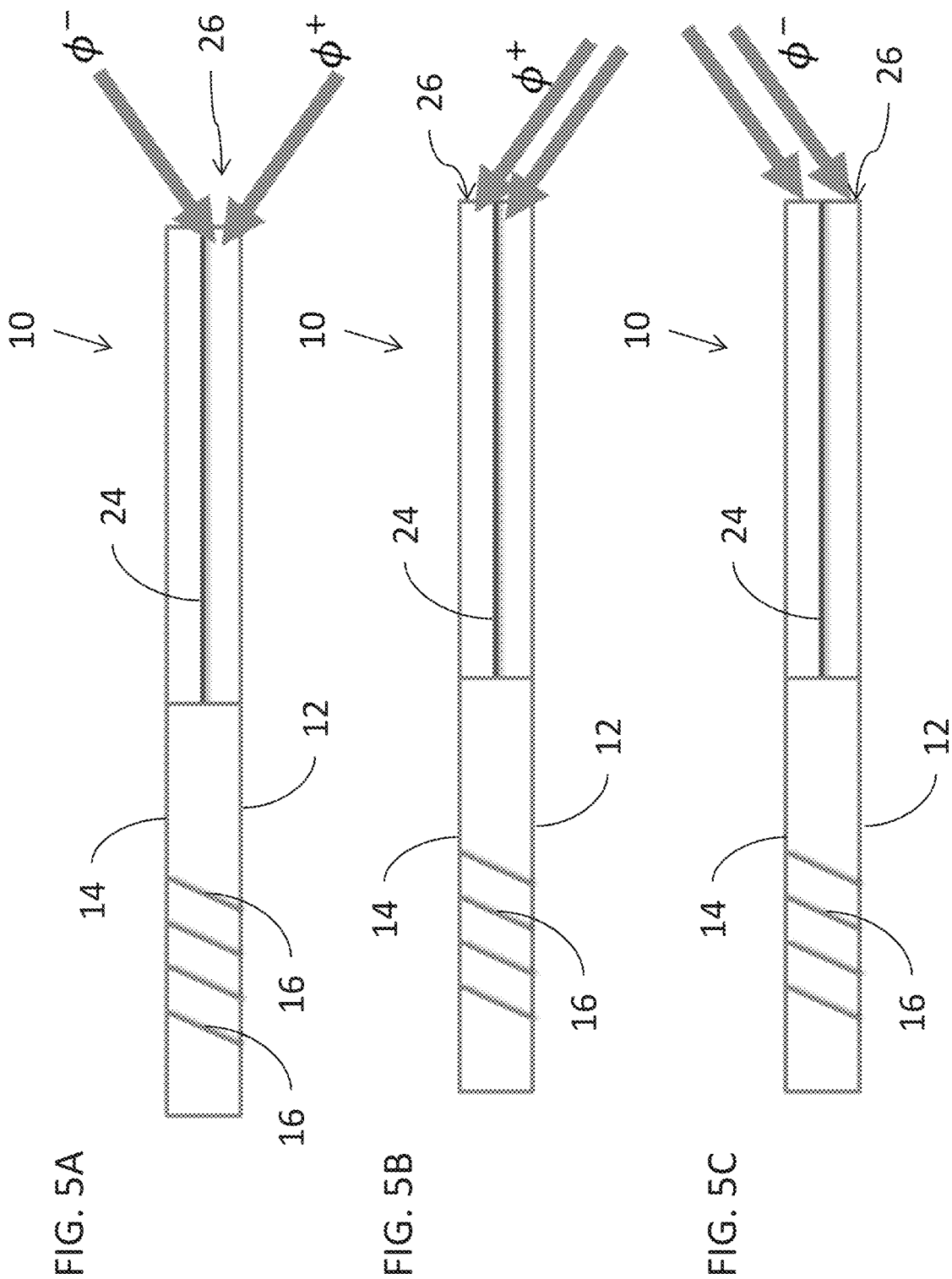

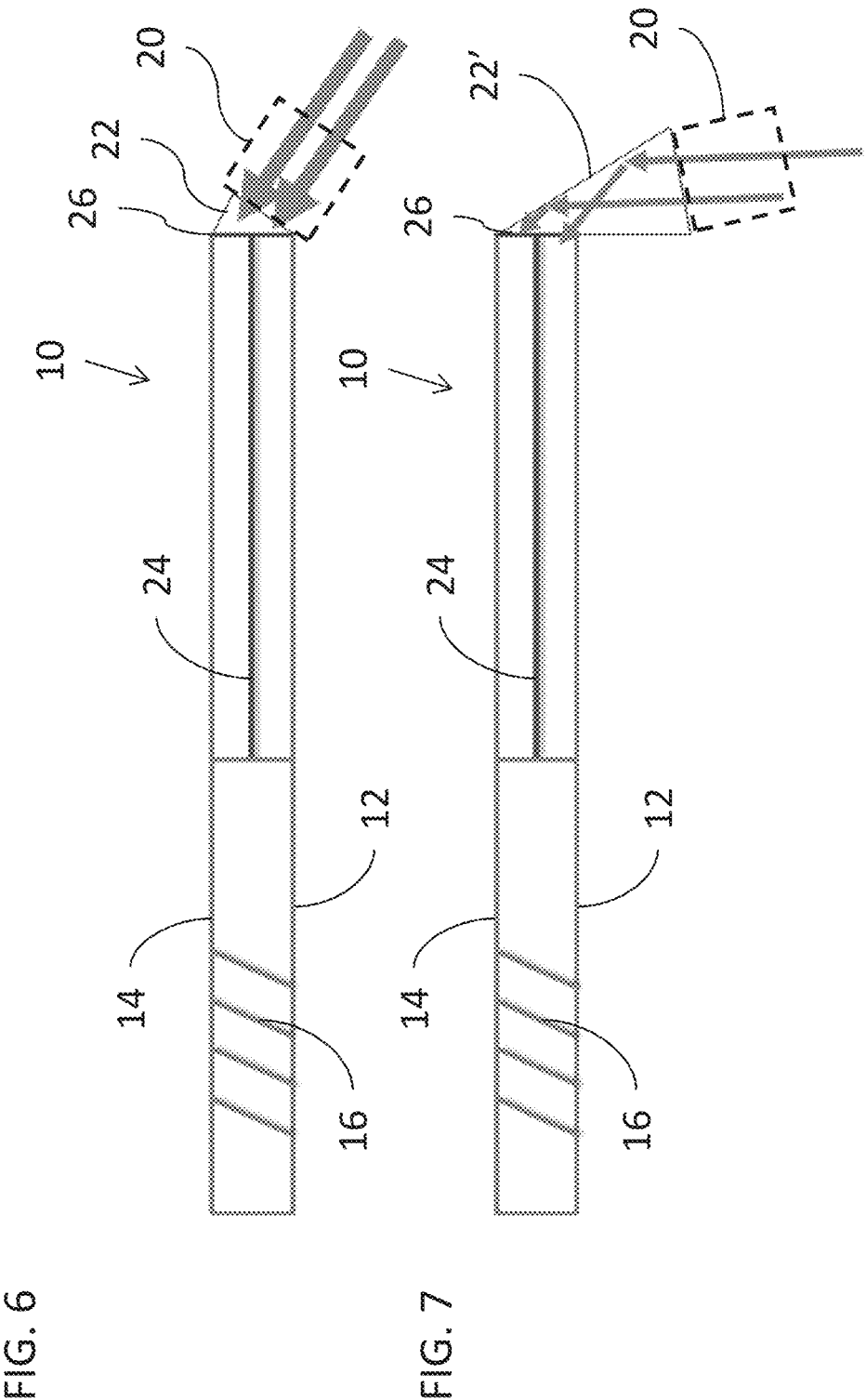

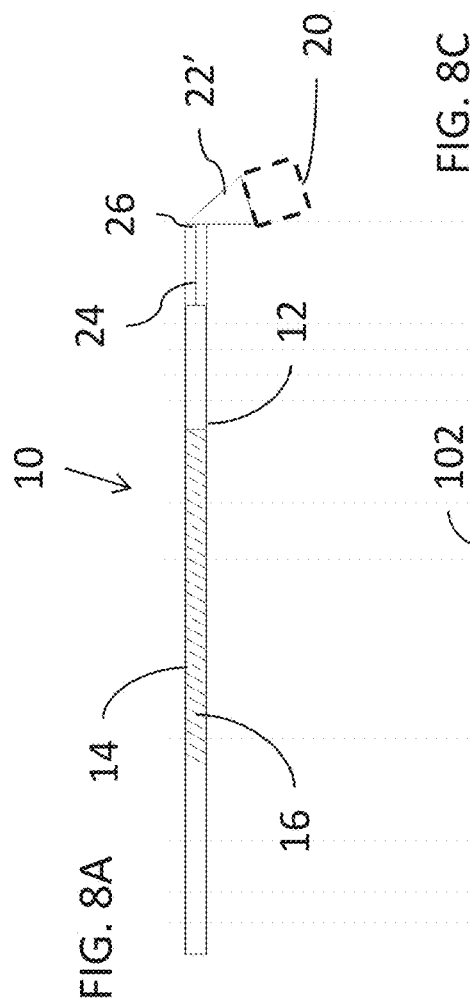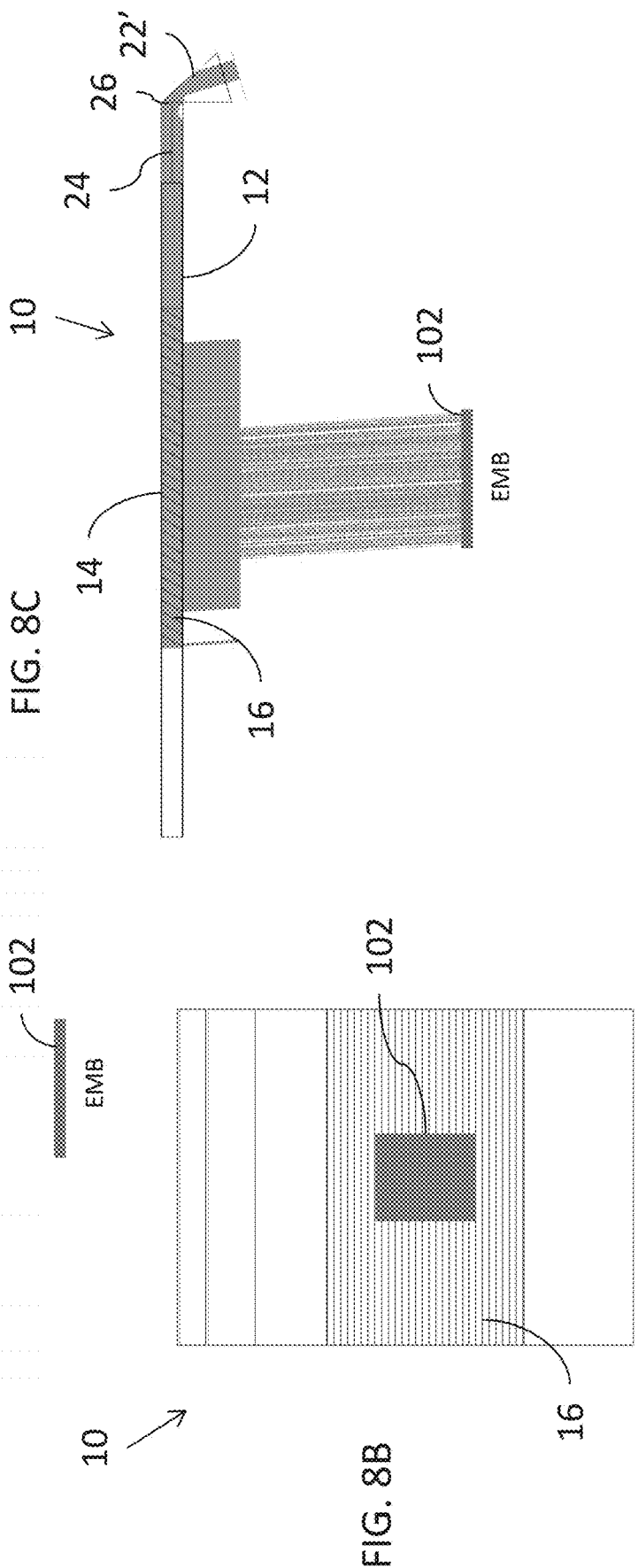

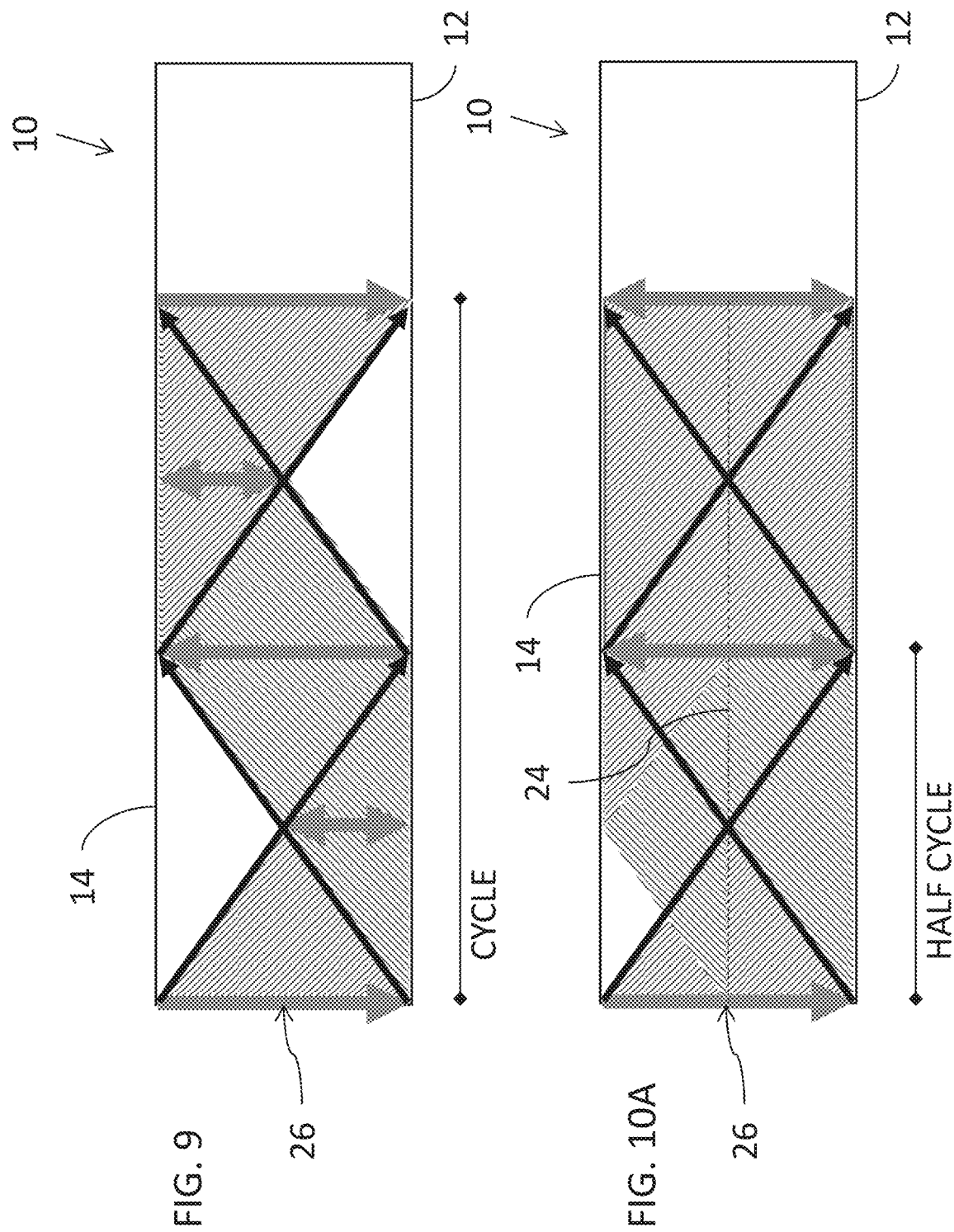

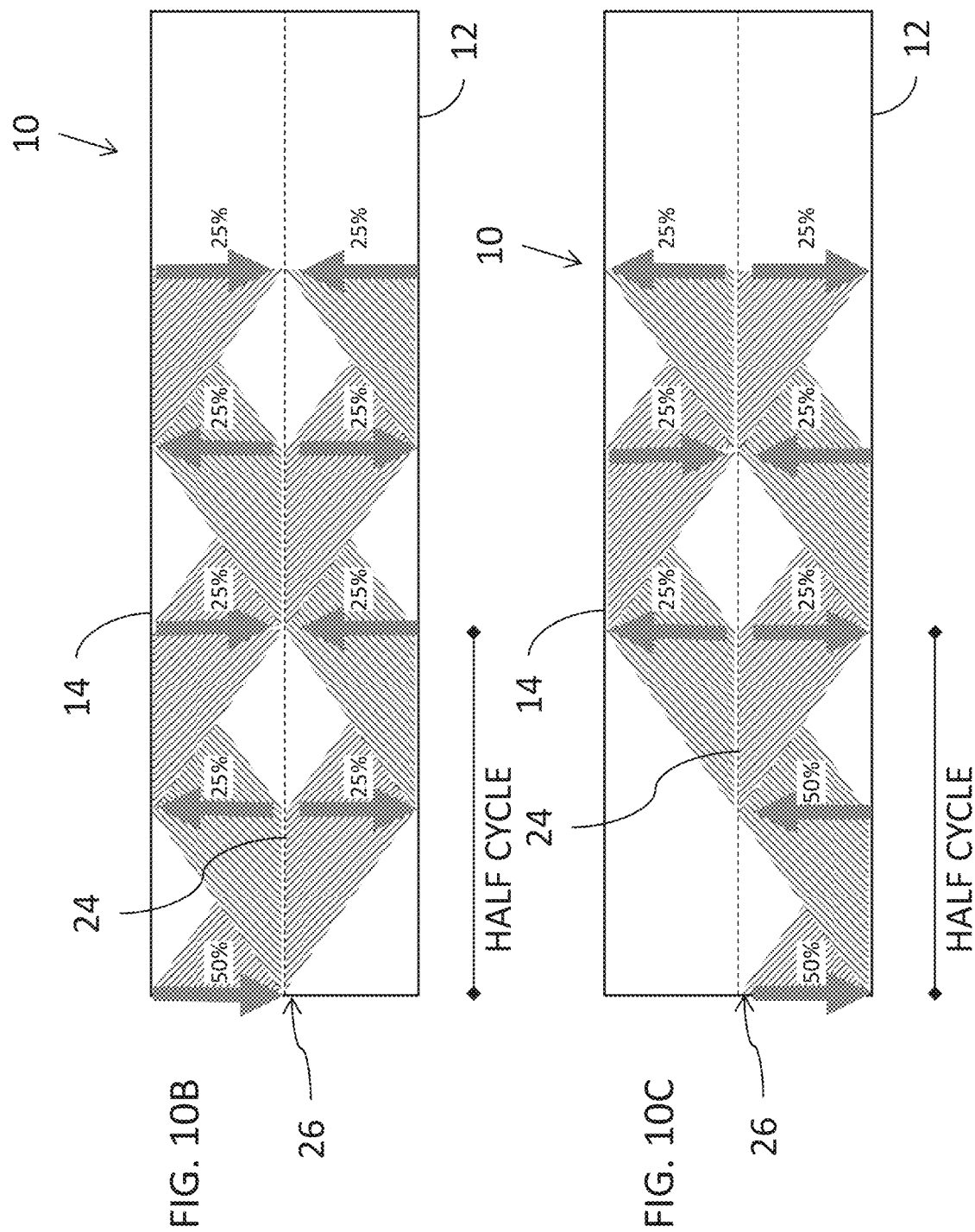

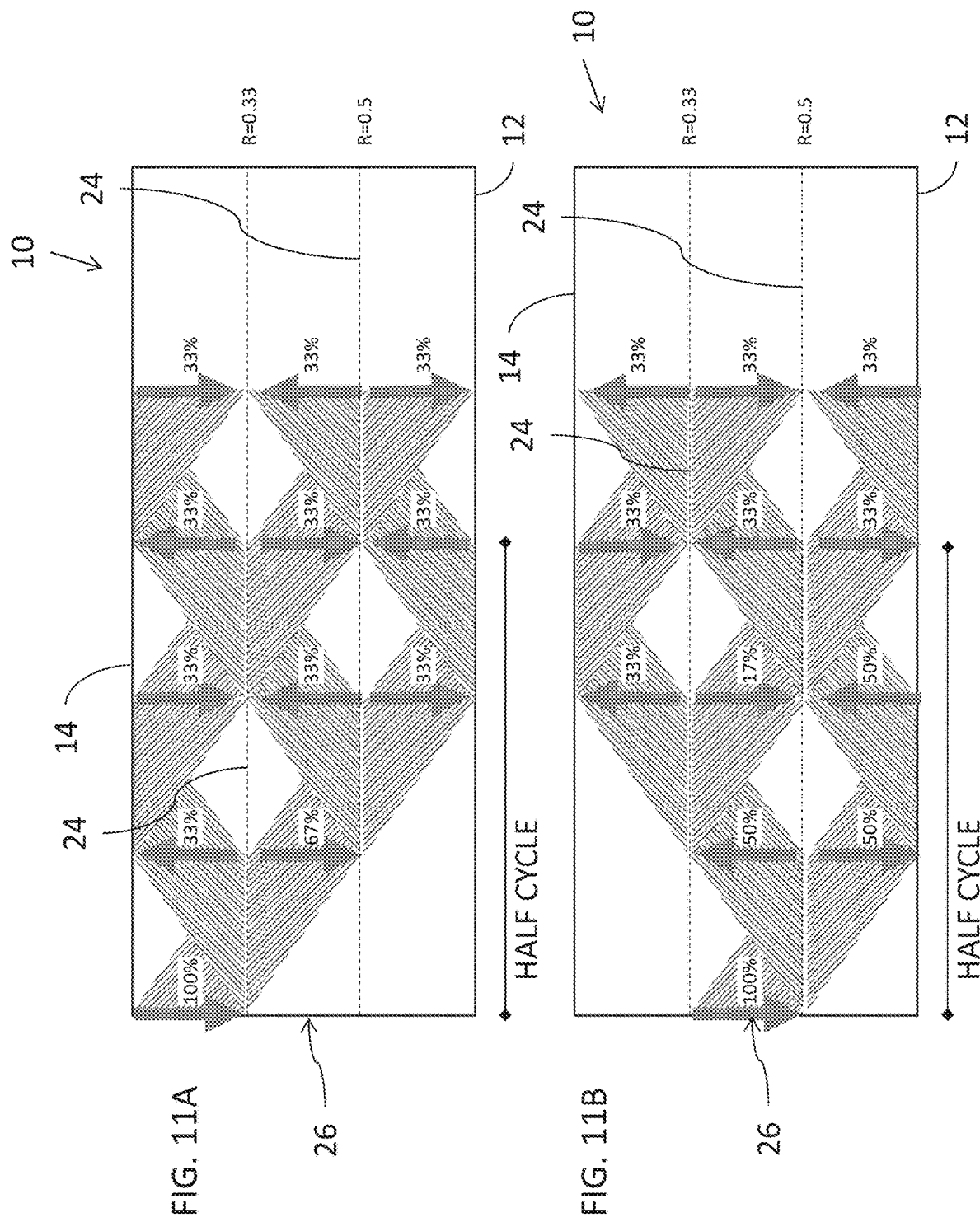

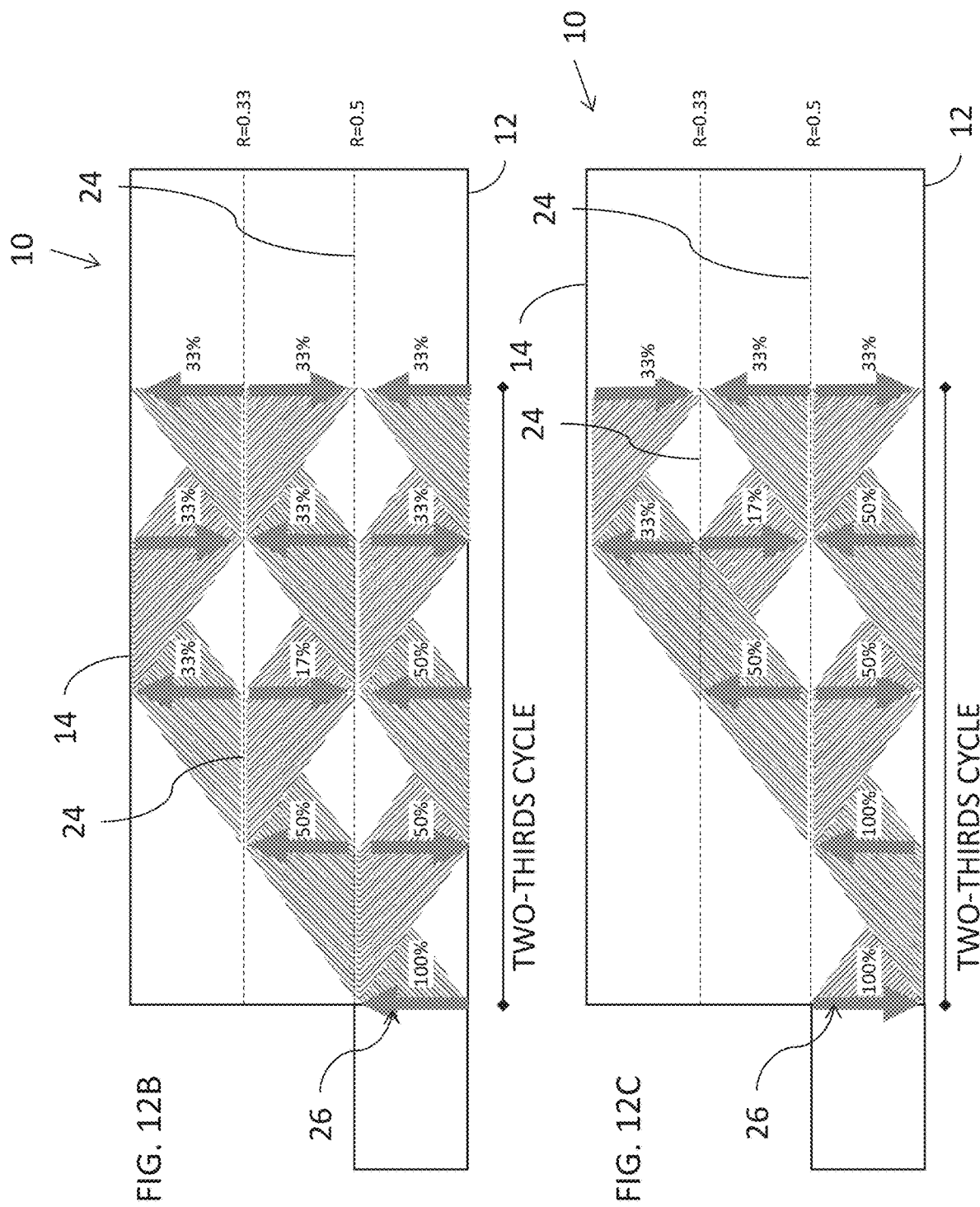

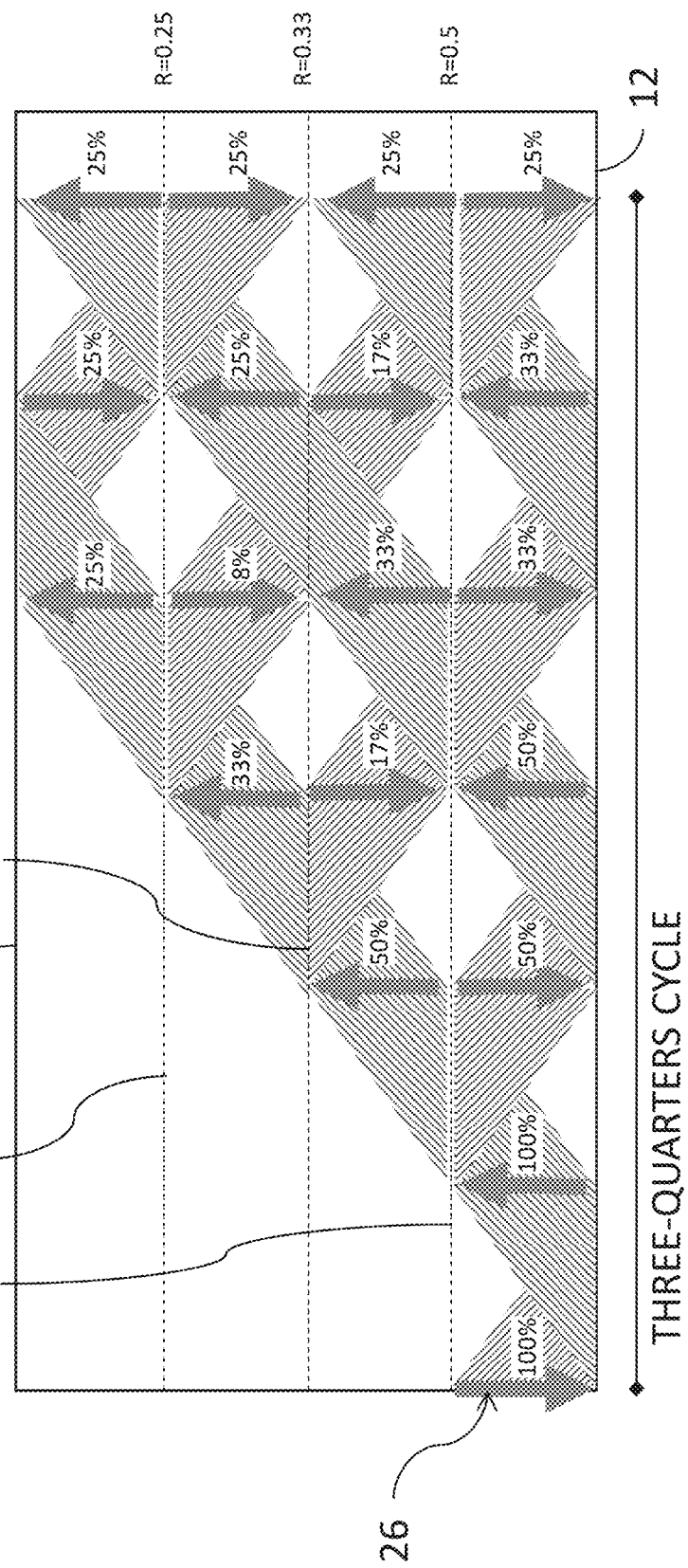

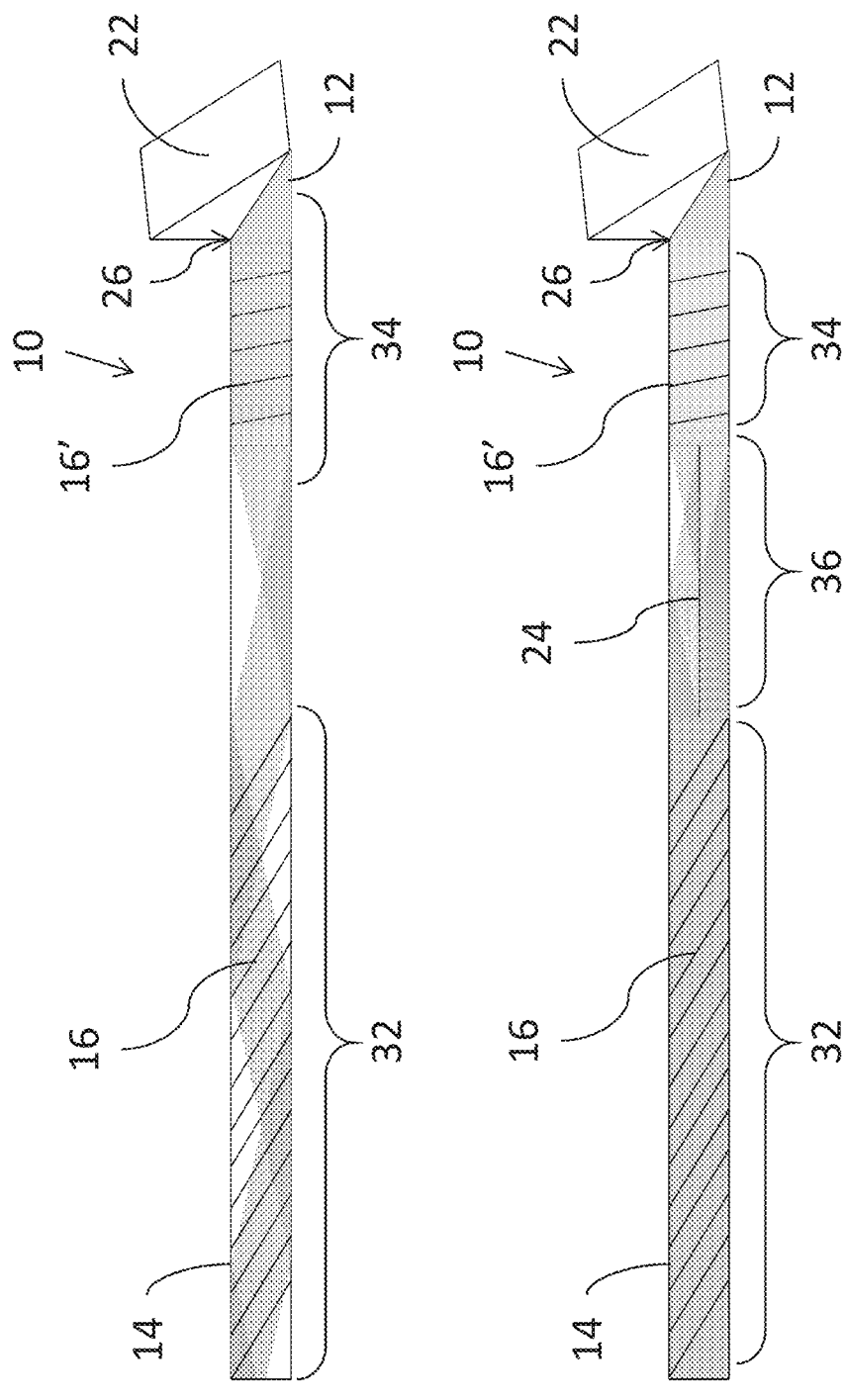

IMAGE WAVEGUIDE WITH SYMMETRIC BEAM MULTIPLICATION

FIELD AND BACKGROUND OF THE INVENTION

The present invention relates to optical systems and, in particular, it concerns image display systems employing a waveguide in which beams of illumination are symmetrically multiplied.

As an exemplary context for implementations of the present invention, various optical displays employ a light-guide optical element (LOE) (interchangeably referred to as a "waveguide" or a "substrate") for conveying an image from an image projector opposite the eye of a user, where it is coupled out, typically by an arrangement of partial reflectors or by a diffractive optical element, towards the eye.

In order to achieve uniformity of the viewed image, the waveguide should be uniformly "filled" with the projected image and its conjugate image. This imposes design limitations on the size of the image projector and various other aspects of the optical design.

SUMMARY OF THE INVENTION

The present invention is a light-guide optical system with symmetric beam multiplication.

According to the teachings of an embodiment of the present invention there is provided, an optical system for displaying an image to an eye of a user comprising: (a) a light-guide optical element (LOE) having two planar major external surfaces that are parallel so as to support propagation of image illumination within the LOE by internal reflection at the major external surfaces; (b) a coupling-out configuration associated with a coupling-out region of the LOE and configured for coupling out at least part of the image illumination from the LOE towards the eye of the user; and (c) an image projector for generating image illumination corresponding to a collimated image, the image projector being optically coupled to the LOE so as to introduce the image illumination into the LOE so as to propagate within the LOE by internal reflection, wherein the LOE further comprises a symmetrical beam multiplier region, distinct from the coupling-out region, the symmetrical beam multiplier region having n internal planar beam splitters, where n is a positive integer, each beam splitter being internal to the LOE and parallel to the major external surfaces, the n beam splitters subdividing a thickness of the LOE between the major external surfaces into (n+1) layers of equal thickness, and wherein the LOE and/or coupling of the image projector to the LOE are configured such that the image illumination entering the symmetrical beam multiplier region either: (i) fills at least two of the layers with image illumination corresponding to the collimated image without a conjugate of the collimated image, or with the conjugate of the collimated image without the collimated image, or (ii) fills only one of the layers with image illumination corresponding to both the collimated image and a conjugate of the collimated image.

According to a further feature of an embodiment of the present invention, the LOE has an input aperture that is perpendicular to the major external surfaces, and wherein the n beam splitters extend up to the input aperture, and wherein the image projector is optically coupled to the input aperture so as to fill the input aperture with the collimated image without the conjugate of the collimated image.

According to a further feature of an embodiment of the present invention, the LOE has an input aperture that corresponds to one of the layers, and wherein the image projector is optically coupled to the input aperture so as to fill the one of the layers with the collimated image and the conjugate of the collimated image.

According to a further feature of an embodiment of the present invention, n=1, and wherein a reflectivity of the beam splitter is ½.

According to a further feature of an embodiment of the present invention, n=2, and wherein a reflectivity of a first of the beam splitters is ½ and a reflectivity of a second of the beam splitters is ⅓.

According to a further feature of an embodiment of the present invention, the coupling-out configuration comprises a plurality of mutually-parallel partially reflecting surfaces deployed within the LOE and obliquely oriented relative to the major external surfaces.

According to a further feature of an embodiment of the present invention, the coupling-out configuration comprises at least one diffractive optical element associated with the LOE and configured for progressively coupling out a part of the image illumination towards the eye of the user.

There is also provided according to a further feature of an embodiment of the present invention, an optical system for displaying an image to an eye of a user comprising: (a) a light-guide optical element (LOE) having two planar major external surfaces that are parallel so as to support propagation of image illumination within the LOE by internal reflection at the major external surfaces; (b) a coupling-in region for introduction of image illumination corresponding to a collimated image into the LOE so as to propagate within the LOE in a first propagation direction; (c) a coupling-out configuration associated with a coupling-out region of the LOE and configured for coupling out at least part of the image illumination from the LOE towards the eye of the user; (d) an aperture expansion configuration associated with the LOE and configured to progressively redirect the image illumination from the first propagation direction so as to propagate within the LOE in a second propagation direction towards the coupling-out configuration; and (e) a symmetrical beam multiplier region, interposed between the aperture expansion configuration and the coupling-out region, the symmetrical beam multiplier region having n internal planar beam splitters, where n is a positive integer, each beam splitter being internal to the LOE and parallel to the major external surfaces, the n beam splitters subdividing a thickness of the LOE between the major external surfaces into (n+1) layers of equal thickness.

According to a further feature of an embodiment of the present invention, the n internal planar beam splitters are implemented as n angularly-selective beam splitters having a first reflectivity for a range of angles corresponding to the image illumination propagating within the LOE, and a second reflectivity, lower than the first reflectivity, for small angles of incidence.

According to a further feature of an embodiment of the present invention, the aperture expansion configuration comprises a plurality of mutually-parallel partially reflecting surfaces deployed within the LOE and obliquely oriented relative to the major external surfaces.

According to a further feature of an embodiment of the present invention, the coupling-out configuration comprises a plurality of mutually-parallel partially reflecting surfaces deployed within the LOE and obliquely oriented relative to the major external surfaces, the partially reflecting surfaces of the coupling-out configuration being non-parallel to the partially reflecting surfaces of the aperture expansion configuration.

According to a further feature of an embodiment of the present invention, the aperture expansion configuration comprises at least one diffractive optical element associated with the LOE and configured for progressively redirecting a part of the image illumination from the first propagation direction to the second propagation direction.

According to a further feature of an embodiment of the present invention, the coupling-out configuration comprises at least one diffractive optical element associated with the LOE and configured for progressively coupling out a part of the image illumination towards the eye of the user.

BRIEF DESCRIPTION OF THE DRAWINGS

The invention is herein described, by way of example only, with reference to the accompanying drawings, wherein:

FIGS. 4A and 4B are schematic representations of stages in the production of the image-projecting waveguide system with symmetric beam multiplication of FIG. 1A;

FIGS. 5A-5C are schematic representations of types of coupling-in configuration for the waveguide of FIG. 1A or 1B, exhibiting a controlled asymmetry;

FIG. 6 is a schematic side view illustrating a first preferred configuration for coupling an image projector to the image-projecting waveguide system with symmetric beam multiplication of FIG. 1A;

FIG. 7 is a schematic side view illustrating a second preferred configuration for coupling an image projector to the image-projecting waveguide system with symmetric beam multiplication of FIG. 1A;

FIGS. 8A and 8B are a side view and a front view, respectively, of the configuration of FIG. 7 corresponding to a model used for ray tracing simulation;

FIG. 8C is a view similar to FIG. 8A illustrating the output of the image-projecting waveguide system for asymmetric coupled-in image illumination;

FIG. 9 is a schematic representation of the illumination pattern within a waveguide for asymmetric coupled-in image illumination lacking a conjugate image;

FIG. 10A is a schematic representation similar to FIG. 9 illustrating the effect of a symmetric beam multiplier according to an aspect of the present invention;

FIGS. 10B and 10C are views similar to FIG. 10A, but illustrating separately the intensity distribution resulting from the illumination of each part of the aperture as it propagates through the symmetric beam multiplier;

FIGS. 11A and 11B are views similar to FIGS. 10B and 10C for a symmetric beam multiplier having two beam splitters dividing the thickness of the waveguide into three layers, where two layers are illuminated with image illumination without a conjugate image;

FIGS. 12B and 12C are representations similar to FIGS. 11A and 11B illustrating the propagation of the image and its conjugate through the symmetric beam multiplier of FIG. 12A;

FIG. 13A is a schematic representation similar to FIG. 10C for a symmetric beam multiplier having three beam splitters dividing the thickness of the waveguide into four layers, illustrating propagation of one image in one layer of the aperture through the symmetric beam multiplier;

FIGS. 15A and 15B are schematic side views illustrating the distribution of illumination within the waveguide of FIG. 14A, without and with the symmetrical beam multiplier, respectively.

DESCRIPTION OF THE PREFERRED EMBODIMENTS

The present invention is a light-guide optical system with symmetric beam multiplication.

The principles and operation of optical systems according to the present invention may be better understood with reference to the drawings and the accompanying description.

Figure 1A:
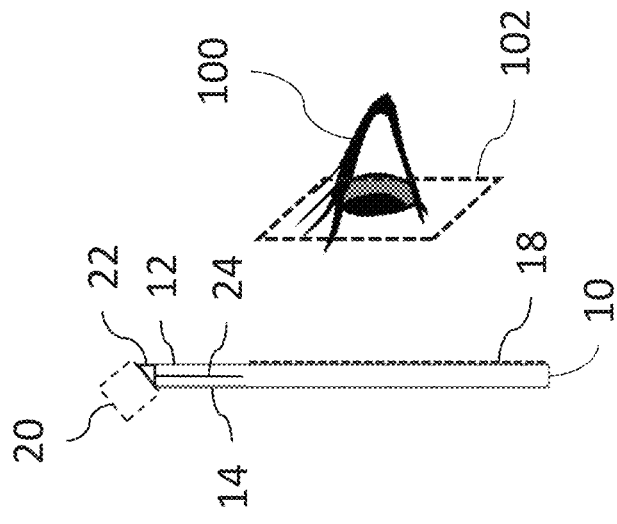
FIGS. 1A and 1B are schematic side views illustrating an image-projecting waveguide system with symmetric beam multiplication according to an embodiment of the present invention, employing reflective and diffractive beam directing components, respectively.
Figure 1B:
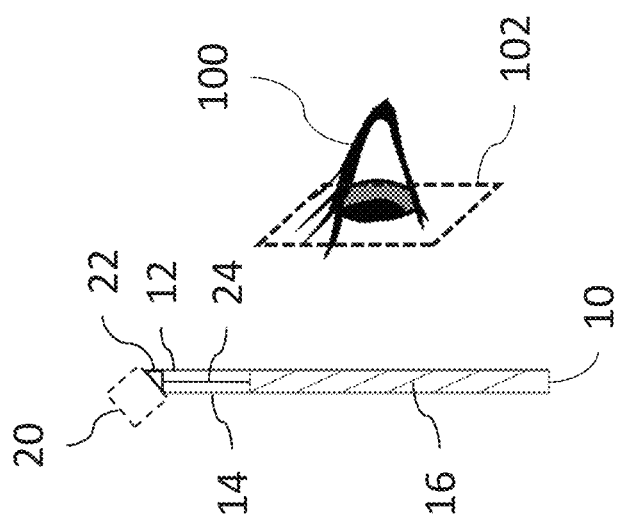

Referring now to the drawings, FIGS. 1A and 1B illustrate schematically a typical implementation of an optical system for displaying an image to an eye 100 of a user, located within a region referred to as the eye motion box (EMB) 102. The system includes a light-guide optical element (LOE) 10 (interchangeably referred to as a "waveguide" or a "substrate") having two planar major external surfaces 12, 14 that are parallel so as to support propagation of image illumination within the LOE by internal reflection at the major external surfaces. A coupling-out configuration is associated with a coupling-out region of LOE 10, and is configured for coupling out at least part of the image illumination from the LOE towards the eye 100 of the user. In certain embodiments, the coupling-out configuration is implemented as a set of mutually-parallel partially reflecting surfaces 16, deployed within the LOE and obliquely oriented relative to the major external surfaces, as illustrated in FIG. 1A. In other embodiments, the coupling-out configuration is implemented as at least one diffractive optical element 18 associated with LOE 10 and configured for progressively coupling out a part of the image illumination towards the eye of the user, as illustrated in FIG. 1B.

An image projector 20, interchangeably referred to as a "POD", generates image illumination corresponding to a collimated image. Image projector 20 is optically coupled to LOE 10 so as to introduce the image illumination into the LOE so as to propagate within the LOE by internal reflection. The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 20 includes at least one light source, typically deployed to illuminate a spatial light modulator, such as an LCOS chip. The spatial light modulator modulates the projected intensity of each pixel of the image, thereby generating an image. Alternatively, or additionally, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, employing reflective optics, as is well known in the art. Alternatively, a free-space optics implementation with reflective and/or refractive optics may be used. Details of the image projector are not per se part of the present invention, and in order to simplify presentation, the image projector is represented here schematically as a dashed box, without any attempt to illustrate the individual components.

Optical coupling of image projector 20 to LOE 10 may be achieved by any suitable optical coupling, such as for example via a coupling prism with an obliquely angled input surface, or via a reflective coupling arrangement, via a side edge and/or one of the major external surfaces of the LOE. Examples of coupling in via a wedge prism may be found in PCT publication no. WO2015162611. Various examples of coupling in using a mirror may be found in PCT publication no. WO2001095027. Except where otherwise specified below, details of the coupling-in configuration are typically not critical to the invention, and are shown here schematically as a non-limiting example of a wedge prism 22 applied to an edge surface of LOE 10. Furthermore, implementations of the present invention that are illustrated herein using a coupling-in prism can equally be implemented using a reflective coupling-in arrangement, and vice versa. The coupling-in configuration determines an angle between the POD and the LOE, denoted as $\alpha_{pod}$ in FIG. 2.

Figure 2:
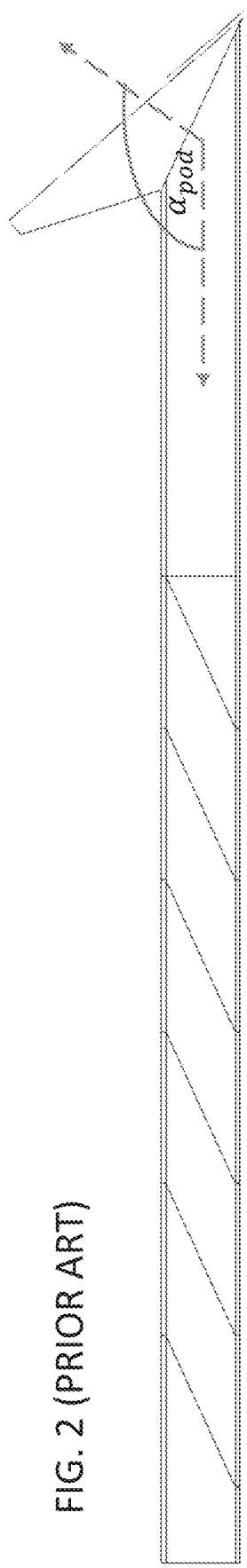
FIG. 2 is a schematic side view of a waveguide employing a coupling-in wedge according to a conventional coupling-in geometry.
Figure 3A:
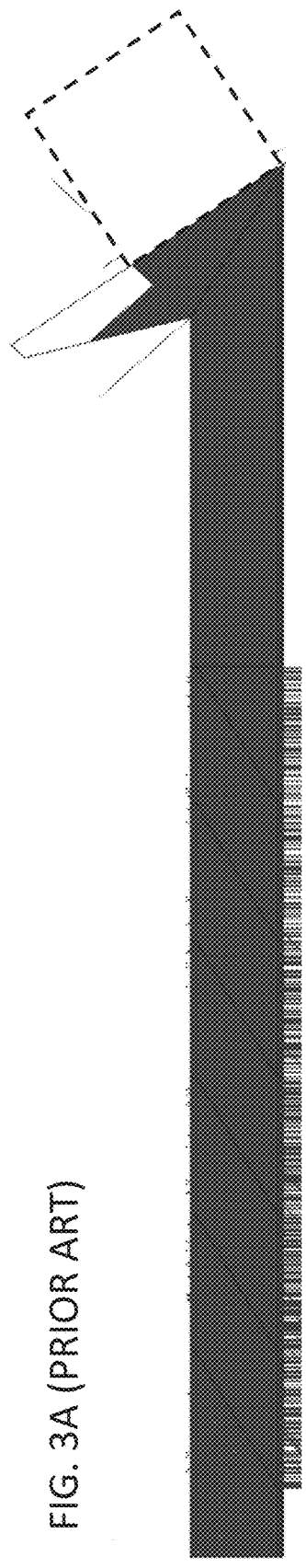
FIGS. 3A and 3B illustrate the results of different size illumination apertures introduced into the waveguide of FIG. 2 achieving full and partial filling of the waveguide, respectively.

FIGS. 2 and 3A illustrate a coupling-in configuration employing a wedge prism 22 according to a conventional approach. The LOE should provide image illumination to the human eye in a uniform distribution over all propagating angles of light (also referred to as "fields" or "field of view"—FOV) and throughout the EMB 102. To this end, each field's aperture should be evenly filled with light. In other words, for any angle of illumination, corresponding to a pixel within the collimated image, the entire cross-section of the LOE in a plane perpendicular to the major surfaces of the LOE should be filled with both the image and its reflection (conjugate) such that, at any point in the LOE volume, rays are present corresponding to all pixels of both the collimated image and its conjugate. In order to achieve this result, as illustrated in FIG. 3A, a relatively large-aperture image projector 20 is used together with an extension to one major surface 12 of the LOE so that the aperture of LOE 10 received full direct illumination of the image and full reflected illumination of the conjugate image internally reflected from surface 12. Image projector 20 must have a correspondingly large aperture to fill the LOE aperture in this manner.

Figure 3B:
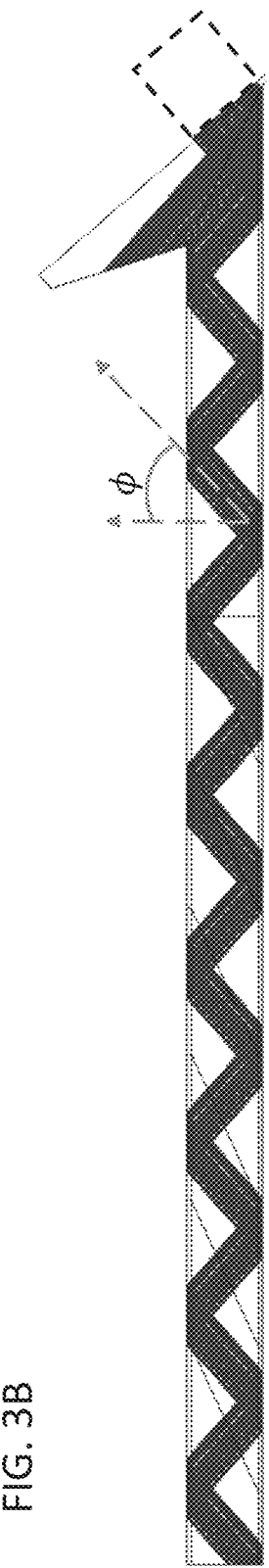

If the "filling" condition is not met, the light shined into the eye will not be evenly distributed. An example of a narrow illumination beam which fails to meet this criterion is shown in FIG. 3B, where a smaller image projector 20 is used with an optical configuration that is otherwise similar to FIG. 3A. When there is a lack of aperture filling, the light exiting the LOE will not be evenly distributed. Non-uniformity of filling of the LOE can occur for a number of reasons, including but not limited to, use of a small aperture projector, use of a small coupling-in geometry, and certain configurations of internal facet reflections.

An aspect of the present invention illustrated in FIGS. 1A, 1B and 4A-16 relates to a range of configurations in which light of a collimated image is guided by, but does not completely fill, a light-guide optical element (LOE) having a pair of major parallel external surfaces, and in particular, where the image propagates without being an image/image-conjugate pair at every point along the LOE. In such situations, according to an aspect of the present invention, it has been found particularly effective to provide LOE 10 with a symmetrical beam multiplier region, distinct from the coupling-out region, the symmetrical beam multiplier region having n internal planar beam splitters 24, where n is a positive integer, each beam splitter 24 being internal to LOE 10 and parallel to the major external surfaces 12, 14. The n beam splitters subdivide a thickness of the LOE between the major external surfaces into (n+1) layers of equal thickness. Thus, in a simplest and particularly preferred example of n=1, beam splitter 24 is implemented as a partial reflecting surface located on a mid-plane between the two major external surfaces, and most preferably, where the partially reflecting surface has a reflectivity of about 50%. Such a symmetrical beam multiplier region is typically implemented by providing the beam splitter as a coating on one plate and then bonding that plate with another similar plate, as illustrated in FIG. 4A. The beam multiplier region is then integrated with other elements to form the overall LOE structure, as illustrated schematically in FIG. 4B.

It has been found that the symmetrical beam multiplier of the present invention has a particular synergy with certain particular asymmetric forms of partial filling of the LOE, where the symmetry of the beam multiplication rapidly achieves full beam uniformity over a short distance. Particularly significant scenarios of such synergy are where the configuration of LOE 10 and/or the coupling of image projector 20 to LOE 10 are such that the image illumination entering the symmetrical beam multiplier region either: (i) fills at least two of the layers with image illumination corresponding to the collimated image without a conjugate of the collimated image (FIG. 5B), or with the conjugate of the collimated image without the collimated image (FIG. 5C), or (ii) fills only one of the layers with image illumination corresponding to both the collimated image and a conjugate of the collimated image (FIG. 5A).

A typical scenario of one type of asymmetry optimally addressed by this aspect of the present invention is illustrated in FIG. 9 where, at an arbitrary starting point taken as the left edge of the LOE as illustrated, light corresponding to a certain field (angular direction, corresponding to a particular pixel) of a collimated image is present across the entire thickness of the LOE propagating in a downwards direction as shown, but the corresponding field of the conjugate image is missing. The downward-propagating image is represented here by a downwards arrow while its upward-propagating conjugate image is represented by an upwards arrow. A region in which the images are mixed is represented by a double-headed arrow. The light propagates towards the right as shown, undergoing total internal reflection at the bottom major surface of the LOE to be converted to the conjugate image, which propagates angled upwards until reflected off the upper surface to again generate the original image. (This process continues beyond what is illustrated here, until the light is coupled out of the LOE.) It is immediately visible that the image and its conjugate do not "fill" the thickness of the LOE. In fact, in this scenario, each of the image and its conjugate are present in half of the volume of the LOE (in the cross-section where the image is propagating), overlapping with each other in some regions and with some totally "dark" regions (which are unshaded in this representation).

A mid-plane 50% mixer has been found to achieve very rapid "filling in" of the missing conjugate image so that, within a very short distance, complete filling of the LOE is achieved, as illustrated in FIG. 10A. The length required to achieve this mixing is ideally no more than half of one cycle of the most shallow-angled rays of the image bouncing between top and bottom surfaces of the LOE. This extremely rapid filling of the LOE with a uniform illumination pattern of both images is a result of the particular synergy mentioned above between a controlled asymmetrical state at the input to the symmetric beam multiplier and the symmetry of the beam multiplier itself.

The mechanism by which this completion of the missing conjugate images and redistribution of image intensity occurs is illustrated schematically in FIGS. 10B and 10C by considering separately the image illumination intensity and direction of propagation for the upper and lower halves of the LOE. FIG. 10B illustrates the intensity distribution between the upper and lower halves of the LOE for image intensity starting in the upper half of the LOE propagating downwards while FIG. 10C shows the same for the image starting downwards in the lower half of the waveguide. Although an entire "cycle" along the LOE is illustrated, it will be noted that uniform image intensity distribution is achieved already after a half cycle. From the directions of the arrows (representing the direction of propagation corresponding to either the primary image or the conjugate), it will be appreciated that the entire LOE is also filled with both images. (Throughout this document, is should be noted that the "primary image" and the "conjugate image" are arbitrarily identified, and are interchangeable, meaning that either, or in some cases both, can be used to convey the image to the observer, and the image projected towards the user may be the same image as injected from the image projector, or may be its conjugate.)

Although this aspect of the invention has been illustrated thus far primarily with reference to a single partial reflector deployed on a mid-plane of the LOE dividing it into two equal parts, it should be noted that the principles can be generalized to "n" partial reflectors deployed parallel to the major surfaces of the LOE such that they divide the thickness equally into "n+1" sections for n=1, 2, 3 etc. In this case, the preferred reflectivities for successive reflectors are ½, ⅓, ... 1/(n+1). By way of example, FIGS. 11A and 11B illustrate the intensity distribution and conjugate image filling for a waveguide subdivided into 3 parts by two partial reflectors with reflectivities ½ and ⅓, and where an image without its conjugate are injected into two of the three layers of the LOE. Here too, in the example illustrated, the intensity of distribution rapidly becomes uniform within half a cycle, and when injected into two of the three layers, has generated both the image and its conjugate over the entire LOE thickness. For simplicity of representation, the input intensity for each layer/third of the thickness has been labeled as 100%.

It will be understood that the reflectances of the various partial reflectors have been identified by their desired values, but the proportion of reflectance is a parameter which may not be precisely defined or precisely achievable in all cases, and the intention here is to refer to values sufficiently close to the theoretical value (e.g., 0.5) that the resulting intensity distribution if sampled would be perceived visually as uniform across the thickness of the LOE. For a single reflecting layer (n=1), a reflectivity of R=0.5+$\Delta$ will result after half a cycle in an intensity difference of $\Delta$ between the image and conjugated image; and, more generally, after m half-cycles, it will result in an intensity difference of $(m-1)*\Delta^m$. Typically, $\Delta$ of 5-10% are visually acceptable even only after one half-cycle. variations of ±5%, or even ±10% in the reflectances may in certain cases render results which are sufficiently close to optimum to be visually acceptable. Parallelism between the partial reflector layer(s) and the major external surfaces of the LOE should be preserved, and the subdivision of the thickness into equal portions is preferably performed to an accuracy of within 10%, and preferably more accurately, in order to avoid generating stripes of non-uniform intensity during the beam multiplication process.

Structurally, the partial reflectivity of the beam multiplying configuration can be implemented using any suitable partially-reflective layer or coating, including but not limited to, a metallic coating, a structural partial reflector (e.g., polka-dot patterned reflector) and multi-layer dielectric coatings. If it is desired to deploy the partial reflector layer in a region through which the observer sees an external "real" scene (particularly although not exclusively relevant to certain embodiments illustrated below with reference to FIGS. 14A-16), the partially-reflective coatings are preferably implemented using an angle-dependent reflective coating in which the coating has 50% reflectivity (or the corresponding desired reflectivity according to the sequence described above, for multiple beam-splitter implementations) at angles in a range corresponding to angles of image light propagation within the LOE while having low reflectivity at small angles (close to perpendicular to the beam splitter), so as to provide less attenuation of light from the directly viewed scene. Layers with such angle-dependent reflectance can readily be achieved using multi-layer dielectric coatings, and are easy to manufacture since the required properties are essentially similar to Fresnel reflection properties. Design of multi-layer coatings to provide such angularly-dependent reflectivity can be performed using standard software packages, as is common practice in the art, and suitable coatings can be obtained commercially from many sources. Accordingly, for conciseness of presentation, the details will not be addressed here.

Optimal uniformity between the primary image and the conjugate image in this case is achieved by injecting the image via a coupling-in aperture covering ⅔ of the thickness of the LOE (either top ⅔ or bottom ⅔ or middle third with part of top and bottom thirds).

Figure 12A:
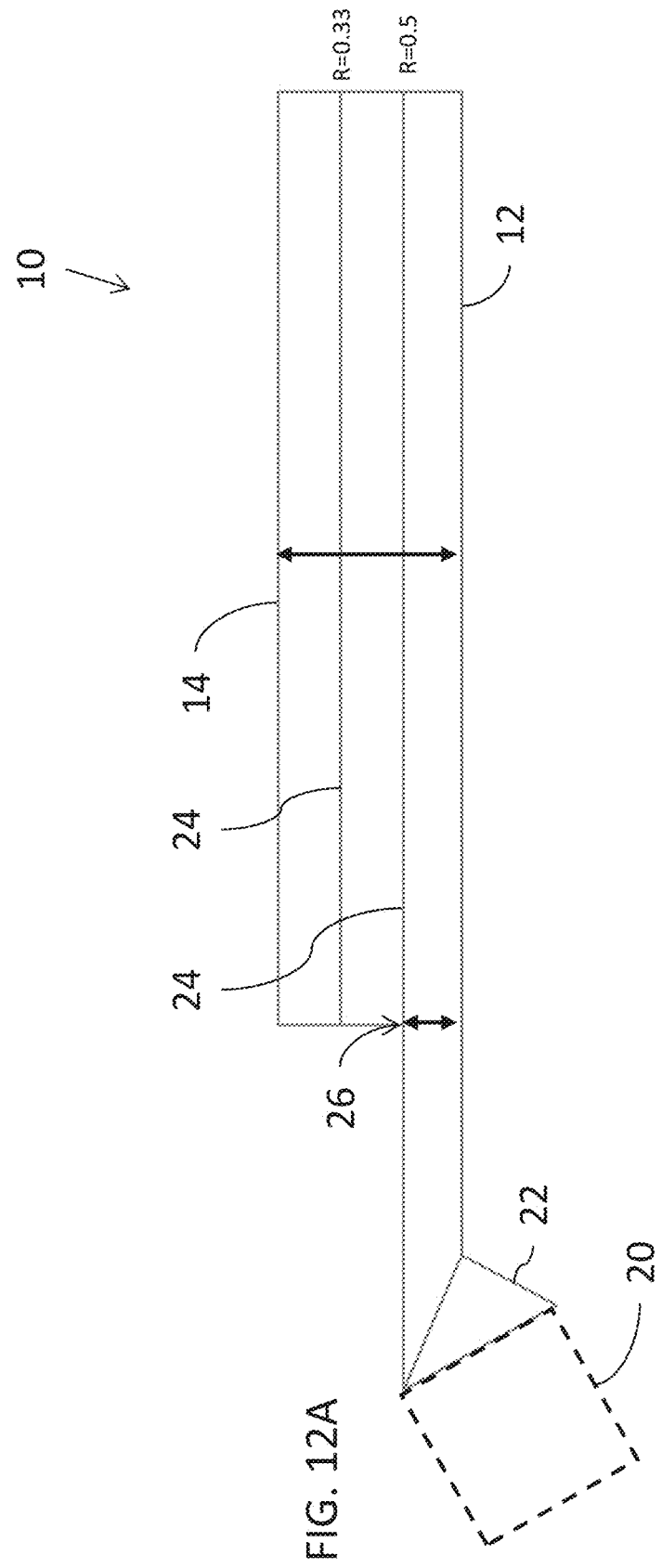
FIG. 12A is a schematic side view of an optical arrangement in which an image projector fills a thin waveguide with both an image and its conjugate, and the image is then expanded to a thicker waveguide by a symmetric beam multiplier, according to a further aspect of the present invention.

FIG. 12A illustrates schematically an alternative form of input state which has particular synergy with the symmetrical beam multiplier of the present invention, namely, where one layer of the LOE is filled with both the image and its conjugate while the other layers are initially without image illumination. FIGS. 12B and 12C illustrate the distribution of the image and conjugate image through the symmetric beam multiplier, which begins at the point at which the LOE thickness increases. In this case, the downward-propagating image as illustrated takes ⅔ of a cycle to reach full uniformity. This would be shortened in this case if the ½ and ⅓ reflectors were interchanged. This scenario facilitates use of a small projector aperture and coupling prism, since coupling-in need only be achieved for a relatively thin layer, and may be useful in any situation where it is desired to increase the thickness of an LOE.

FIG. 13A illustrates a further example, with 3 reflectors having reflectance ¼, ⅓ and ½, respectively, dividing an LOE thickness into 4 equal portions), and illustrates the part of the aperture which takes the longest length along the LOE to equalize its intensity across the thickness of the LOE, still taking less than a single cycle of reflection between the top and bottom surfaces of the LOE. Such an example can provide uniform filling of the thickness of the LOE using an input aperture which provides only one image (without its conjugate) over a thickness of half the thickness of the LOE, or across the entire thickness of the LOE, whichever is preferred, or which provides a full coupling of the image and its conjugate into one layer.

Figure 13B:
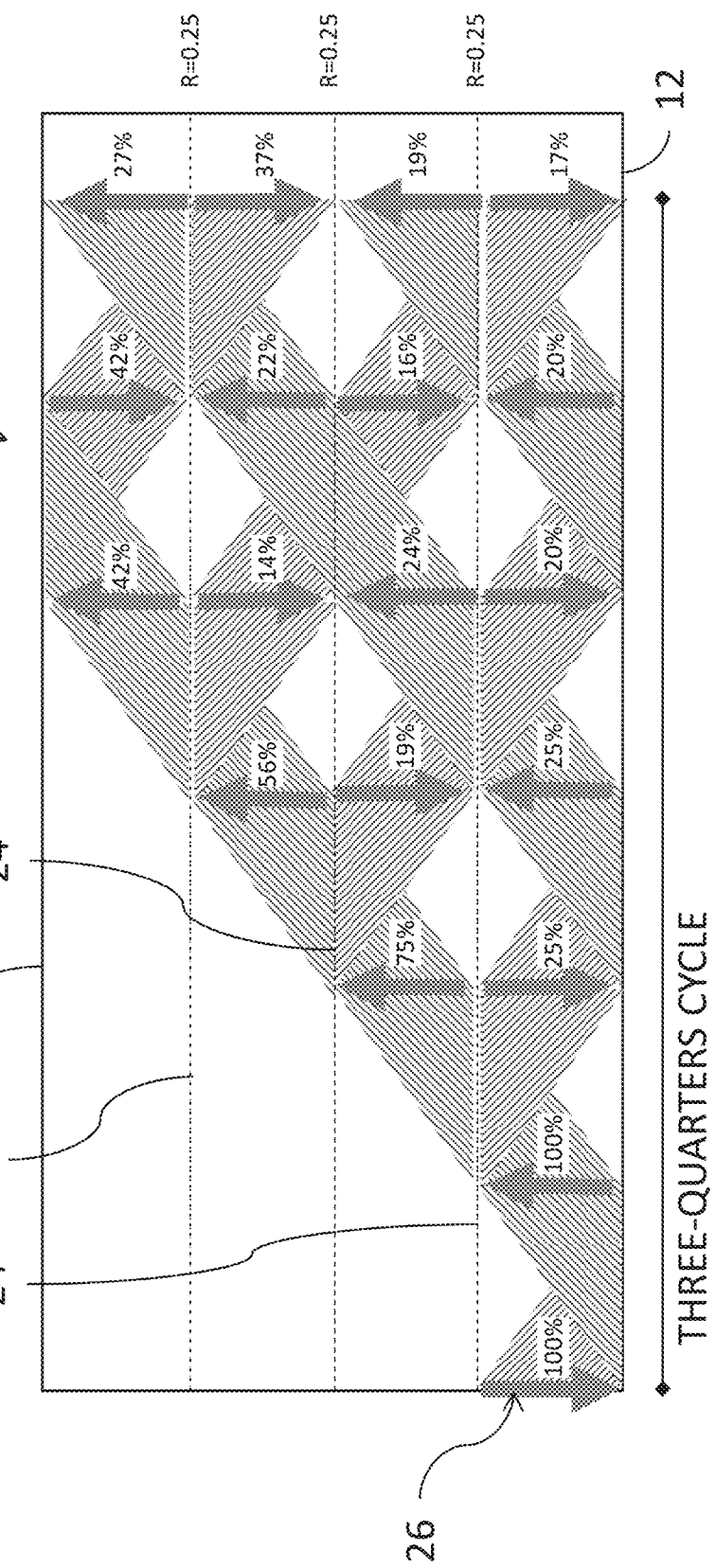
FIGS. 13B and 13C are views similar to FIG. 13A illustrating the effects of employing equal reflectivity of 0.25 or 0.5 for each beam splitter.
Figure 13C:
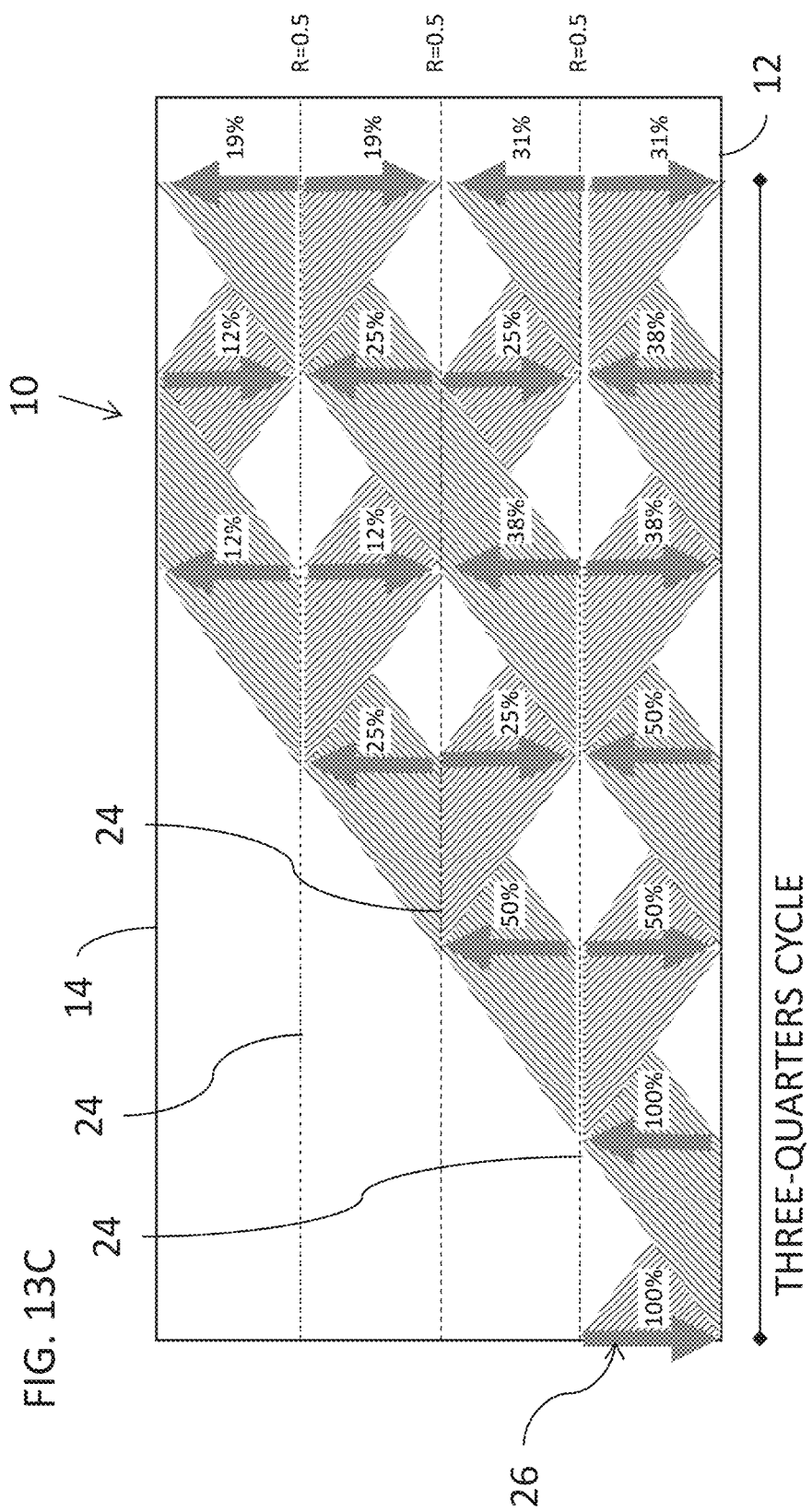

It is noted that the particular sequence of reflectivities disclosed achieves rapid equalization of illumination intensity in a manner that cannot be achieved using multiple beam splitters with equal partial reflectance. By way of comparative examples, FIGS. 13B and 13C are cases similar to FIG. 13A where all three of the partially reflective layers have the same reflectance of either 0.25 (FIG. 13B) or 0.5 (FIG. 13C). In both cases, the intensity distribution is still far from uniform after the same path length that achieved uniformity in FIG. 13A.

As mentioned, optimal performance of the symmetric beam multiplier is achieved when the input illumination has a well-defined asymmetry which is has synergy with the beam multiplier structure. For this reason, in a first set of particularly preferred implementations, beam splitters 24 extend up to an input aperture 26 of LOE 10, which is advantageously perpendicular to the major external surfaces 12, 14. According to certain implementations of the present invention, image projector 20 is optically coupled to input aperture 26 so as to fill the input aperture with the collimated image without the conjugate of the collimated image. Two exemplary configurations for achieving such optical coupling are illustrated schematically in FIGS. 6 and 7.

In FIG. 6, a coupling prism 22 provides a coupling-in surface roughly perpendicular to a central (nominal) ray of an image from image projector 20, and allows the image to enter input aperture 26 without prior reflection. The coupled-in image is a single image without a conjugate, and the symmetric beam multiplier reconstructs the image/conjugate combination as described.

FIG. 7 illustrates a functionally similar arrangement where a coupling-prism 22' is configured to provide a surface at which the image undergoes one reflection before reaching the perpendicular input aperture 26 of the LOE. This configuration facilitates an orientation of the image projector which extends at a large angle to the plane of the LOE, and with minimum bulk extending beyond the end of the LOE, which may be particularly advantageous for certain practical implementations, particular for near-eye displays which adopt an eyeglass frame form.

FIGS. 8A and 8B are a side and front view, respectively, of an implementation of the device of FIG. 7 showing the relative position of the EMB 102 to LOE 10, and FIG. 8C is the result of ray-tracing software analyzing a particular pixel field of an image projected through this design. It is seen that the coupled-in image is delivered uniformly to the EMB, despite the coupling-in providing an image without its conjugate.

The compactness of these coupling-in configurations is better understood by comparing them to the conventional approach illustrated in FIGS. 2 and 3A. In that case, where one face of the LOE is extended beyond the LOE aperture to provide a coupling-in wedge to fill the aperture with both the image and its conjugate, especially when having very large (grazing) propagating angles the coupling-in mechanism has two main problems:

1. The size of wedge is large, since it is comparable to d Tan($\phi_m$) which increases dramatically when $\phi_m$ approaches grazing angles.
2. The angle between LOE and the POD is governed by the central FOV propagation $\alpha_{pod}$=90+$\phi_c$ (where $\phi_c$ is the central FOV propagation angle) could be very not attractive for some systems. For instance. For side pod systems (glasses like) $\alpha_{pod}$ is desirable to be about 110 degrees and when $\phi_c$=60° then $\alpha_{pod}$=150°

In contrast, since the arrangements of FIGS. 6 and 7 couple in only one image, without its conjugate, through a perpendicular input aperture 26, the size of the coupling prism 22 is no longer relative to Tan($\phi_m$) but rather to its cosine function: cos($\phi_m$). Where a folding facet is used to break the light propagating angle and change $\alpha_{pod}$, as shown in FIG. 7, this introduces an additional degree of freedom in the geometrical design. In the example illustrated here, the central propagation angle of the image entering the input aperture of the waveguide is 60 degree, but due the folding prism serving as a wedge, the pod angle $\alpha_{pod}$ is 106.5, with a relatively small aperture size.

Due to the rapid equalization of the image intensity across the LOE thickness using the particular configurations defined herein, the beam multiplication arrangement of the present invention may optionally be deployed selectively along a relatively short section of the LOE, which may typically be no more than about 5 times the thickness of the LOE, and in some cases no more than 3 times the thickness of the LOE. Although use of a longer partially reflective surface does not adversely affect the uniformity of the beam filling, the ability to achieve effective beam multiplication over a short length of the LOE provides profound advantages with regard to compactness of design, minimizing any scattering effects of the reflectors, and keeping the partial reflectors outside the viewing region of the LOE through which the observer views the real world.

This aspect of the present invention may be used to advantage in a wide range of contexts and configurations to facilitate compact and efficient system design in situations where arrangements for filling an LOE directly with an image and its conjugate is either unfeasible or cannot be done without compromise of other design considerations such as size and/or form factor.

The required length of beam splitter 24 for the 50% mid-plane beam splitter configuration is typically half of the biggest aperture (i.e., half a cycle) from all parts of the field propagating in the LOE. This length is given by $L_m$=0.5 d Tan($\phi_m$) where d is the thickness of the LOE and $\phi_m$ is the biggest propagation angle of all fields relative to the normal of the LOE (see FIG. 3B).

Structurally the mixer is typically produced by optically bonding a corresponding number of layers having the required beam splitter coatings applied to one of the facing surfaces, and then integrating the assembled stack with the other sections required to assemble the final LOE, according to the various examples illustrated herein. Optionally, after assembly of the parts, the major external surfaces are re-polished to ensure mutual parallelism and continuity across the joints. Optionally, a coupling in element, such as a wedge similar to that of FIG. 6 or 7 illustrated above, may be added. It is important to emphasize that the order of the steps presented here is only an example, and that alternative sequences of construction, and alternative construction techniques, also fall within the scope of the present invention.

Turning now to a further set of exemplary embodiments of the present invention, illustrated with reference to FIGS. 14A-16, some display systems employ an LOE which includes two stages of optical expansion within a single waveguide. In such cases, an image projector is coupled to a coupling-in region 30 so as to introduce image illumination corresponding to a collimated image into the LOE so as to propagate within the LOE in a first propagation direction $p_1$ (FIG. 14B), and a coupling-out configuration associated with a coupling-out region 32 of the LOE and configured for coupling out at least part of the image illumination from the LOE towards the eye of the user. As before, the coupling-out configuration may be a set of mutually-parallel partially reflecting surfaces 16, deployed within the LOE and obliquely oriented relative to the major external surfaces, as illustrated here, and in FIG. 1A, above, or may be implemented as at least one diffractive optical element, as described above with reference to FIG. 1B.

The device also includes an aperture expansion configuration 34, associated with the LOE and configured to progressively redirect the image illumination from the first propagation direction $p_1$ so as to propagate within the LOE in a second propagation direction $p_2$ towards the coupling-out configuration. Here too, the aperture expansion configuration may be based on a plurality of mutually-parallel partially reflecting surfaces 16' deployed within the LOE and obliquely oriented relative to the major external surfaces, as illustrated here, or on one or more diffractive optical element (not shown). In either case, the aperture expansion configuration 34 is differently oriented from the coupling-out configuration so as to achieve expansion along a different in-plane axis.

Certain implementations of the aperture expansion configuration 34 result in redirection of one of the images towards coupling-out region 32 while the conjugate of that image is reflected to an undesired angular orientation, and is effectively lost. For such cases, a symmetrical beam multiplier region 36 is preferably interposed between aperture expansion configuration 34 and coupling-out region 32, so as to compactly reconstruct the image/conjugate pair and fill the waveguide with the image to be coupled out. Structurally, symmetrical beam multiplier region 36 is preferably identical to the beam multiplier structured disclosed above, having i) internal planar beam splitters 24, internal to the LOE and parallel to the major external surfaces, subdividing the thickness of the LOE into (n+1) layers of equal thickness.

Figure 14A:
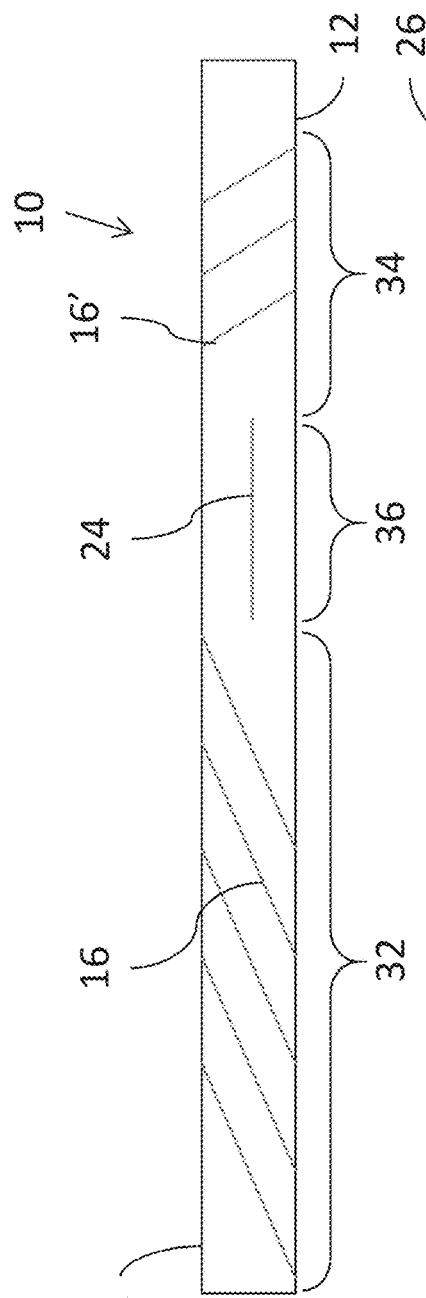
FIGS. 14A and 14B are a side view and a front view, respectively, of a waveguide for two-dimensional optical aperture expansion employing an intermediate symmetrical beam multiplier between two stages of aperture expansion.
Figure 14B:
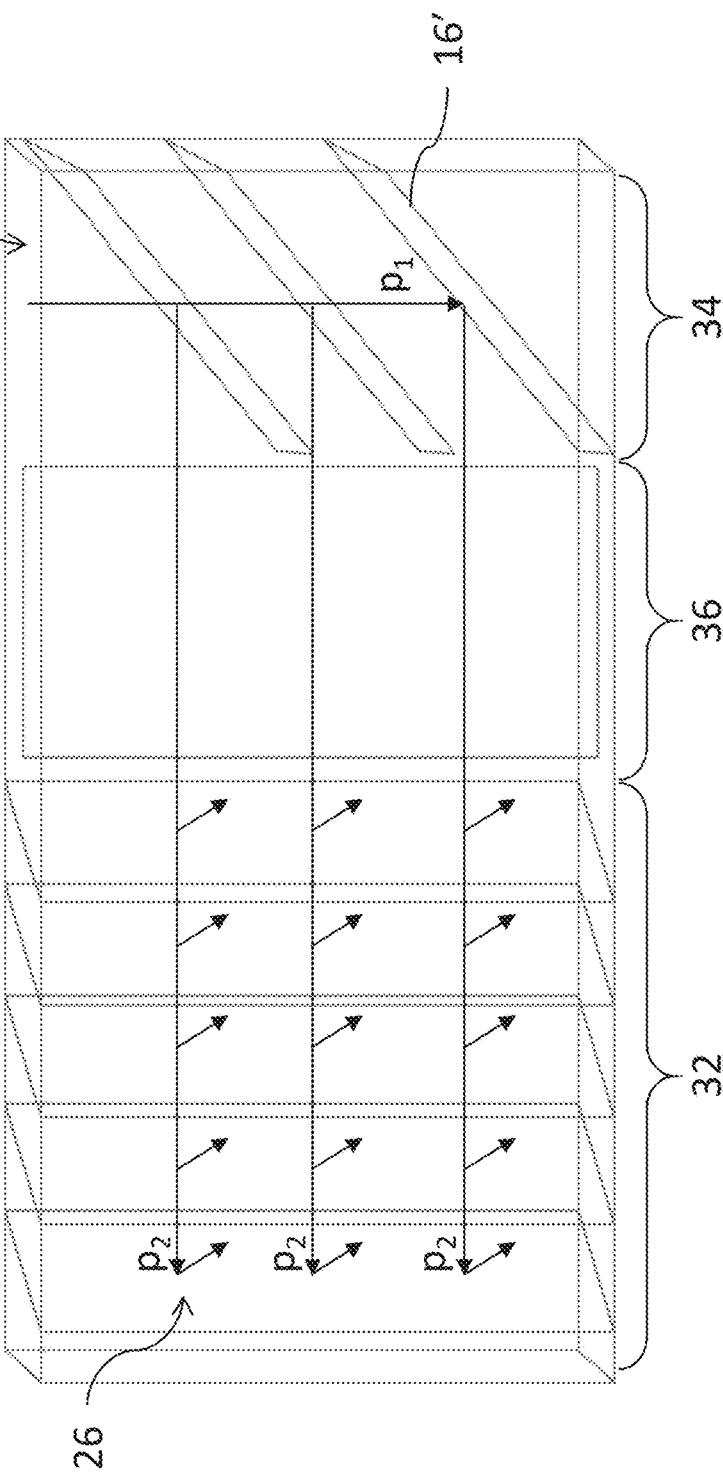

The symmetrical beam multiplier can thus here be considered a mediating mechanism between several in-plane LOEs, as presented in FIGS. 14A and 14B. As explained above, all beams in the waveguide (LOE) bounce "up" and "down" between the major surfaces due to total internal reflection (TIR). In compound systems where several LOEs (or stages of expansion) are coupled in-plane as a single LOE sharing common major external parallel surfaces. For a reflective aperture expansion arrangement, if the partially-reflective surfaces are not perpendicular to the plane of the LOE, up-going and down-going beams inside the first LOE are reflected at different angles. As a result, only the up-going or down-going rays will eventually be coupled out to the observer's eye (while the down-going or up-going rays would be considered as unwanted "ghost" images propagating inside the waveguide, that may contaminate the out-coupled signal). However, depending on the facet and field angles, this effect may create "holes" (dark stripes) inside the waveguide, i.e. it may cause partial filling of the entrance aperture of the second LOE, as demonstrated in FIG. 15A (for clarity, only showing rays that reach the eye). To overcome this limitation, the symmetric beam multiplier is placed between the two LOEs, thereby duplicating the present rays (up-going or down-going), such that the entire aperture of the second LOE is filled (FIG. 15B). As before, the size of the mixer should be at least half the aperture size of the most shallow-propagating field in the second LOE.

Figure 16:
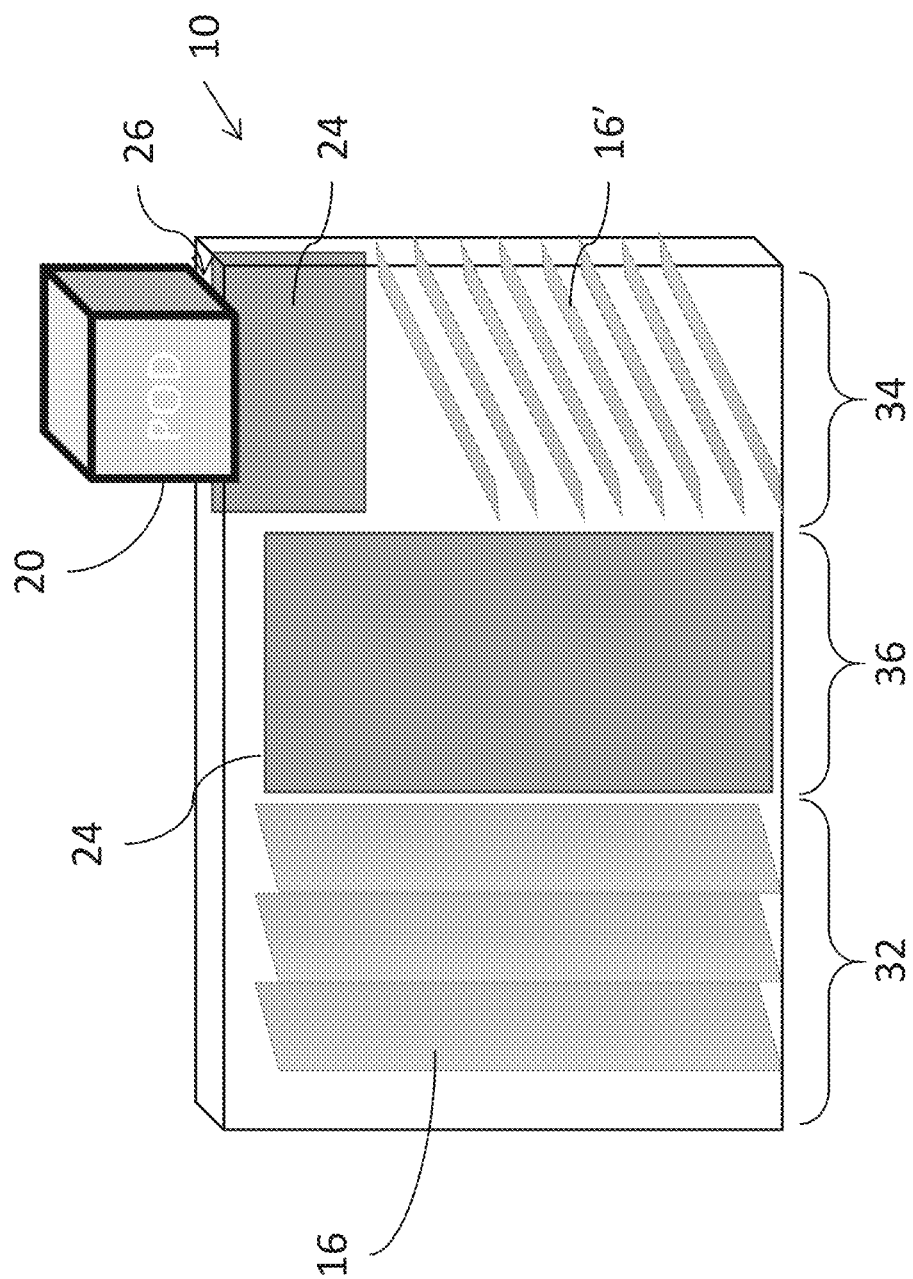
FIG. 16 is a schematic isometric representation of a display system with two-dimensional aperture expansion which employs a first symmetrical beam multiplier associated with a coupling-in aperture and a second symmetrical beam multiplier intermediately positioned between two stages of optical aperture expansion.

FIG. 16 illustrates schematically a system employing an image projector POD 20 coupling in directly (typically via a coupling prism, not shown) to the input aperture 26 of a compound waveguide (LOE) with two-stage aperture expansion. This example combines both aspects of the invention described above, including a first mid-plane 50% beam splitter 24 to perform aperture filling that is not achieved directly by the POD coupling in, followed by an aperture expansion configuration 34, implemented using a first set of oblique partially-reflective internal surfaces, to achieve a first dimension of aperture expansion and redirect the image illumination towards a coupling-out region 32. A symmetrical beam multiplier region 36 interposed between aperture expansion configuration 34 and coupling-out region 32 reconstructs the image/conjugate filling of the waveguide, leading to filling uniformity of the image projected towards the eye of the user.

It will be appreciated that the display includes various additional components, typically including a controller for actuating the image projector, typically employing electrical power from a small onboard battery or some other suitable power source. It will be appreciated that the controller includes all necessary electronic components such as at least one processor or processing circuitry to drive the image projector, all as is known in the art. These features are not part of the invention per se, and therefore will not be described here in detail. All such features will be readily implemented by a person ordinarily skilled in the art.

It will be appreciated that the above descriptions are intended only to serve as examples, and that many other embodiments are possible within the scope of the present invention as defined in the appended claims.

What is claimed is:

1. An optical system for displaying an image to an eye of a user comprising:
   (a) a light-guide optical element, LOE having two planar major external surfaces that are parallel so as to support propagation of image illumination within the LOE by internal reflection at the major external surfaces:
   (b) a coupling-out configuration deployed at a coupling-out region of the LOE and configured for coupling out at least part of the image illumination from the LOE (towards the eye of the user; and
   (c) an image projector for generating image illumination corresponding to a collimated image, the image projector being optically coupled to the LOE so as to introduce the image illumination into the LOE so as to propagate within the LOE by internal reflection, characterized in that the LOE further comprises a beam multiplier region, distinct from the coupling-out region, the beam multiplier region having n internal planar beam splitters, where n is an integer greater than 1, each beam splitter being internal to the LOE and parallel to the major external surfaces, the n beam splitters subdividing a thickness of the LOE between the major external surfaces into (n+1) layers of equal thickness, each beam splitter having a reflectivity for image illumination propagating within the LOE by internal reflection given by $1/(i+1)$ where i is an index for sequential beam splitters for i from 1 to n.

2. The optical system of claim 1, wherein the coupling-out configuration comprises a plurality of mutually-parallel partially reflecting surfaces) deployed within the LOE and obliquely oriented relative to the major external surfaces.

3. The optical system of claim 1, wherein the coupling-out configuration comprises at least one diffractive optical element deployed at the coupling-out region of the LOE and configured for progressively coupling out a part of the image illumination towards the eye of the user.

4. The optical system of claim 2, wherein the coupling-out configuration comprises at least one diffractive optical element deployed at the coupling-out region of the LOE and configured for progressively coupling out a part of the image illumination towards the eye of the user.

\* \* \* \* \*